(12) United States Patent
Tsujimoto et al.

(10) Patent No.: US 12,353,087 B2
(45) Date of Patent: Jul. 8, 2025

(54) OPTICAL FILM, IMAGE DISPLAY PANEL, AND IMAGE DISPLAY DEVICE

(71) Applicant: DAI NIPPON PRINTING CO., LTD., Tokyo (JP)

(72) Inventors: Jun Tsujimoto, Bizen (JP); Gen Furui, Okayama (JP); Yukimitsu Iwata, Okayama (JP); Shigeki Murakami, Okayama (JP); Takumi Yoneyama, Tsukuba (JP); Mitsuhiro Kuzuhara, Okayama (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 0 days.

(21) Appl. No.: 18/717,369

(22) PCT Filed: Apr. 25, 2023

(86) PCT No.: PCT/JP2023/016223
§ 371 (c)(1),
(2) Date: Jun. 6, 2024

(87) PCT Pub. No.: WO2023/210622
PCT Pub. Date: Nov. 2, 2023

(65) Prior Publication Data
US 2025/0044635 A1    Feb. 6, 2025

(30) Foreign Application Priority Data
Apr. 27, 2022  (JP) ................. 2022-073216

(51) Int. Cl.
G02F 1/1335  (2006.01)
(52) U.S. Cl.
CPC .................. G02F 1/133502 (2013.01)

(58) Field of Classification Search
CPC ............ G02F 2201/38; G02F 2201/40; G02F 1/133502; G02F 1/133504
See application file for complete search history.

(56) References Cited

U.S. PATENT DOCUMENTS

2008/0260997 A1    10/2008  Iwata et al.
2011/0244218 A1*   10/2011  Suzuki .............. C08F 2/48
                                              522/182
(Continued)

FOREIGN PATENT DOCUMENTS

JP    2010122560 A    6/2010
JP    2015206841 A    11/2015
(Continued)

OTHER PUBLICATIONS

Request for the Submission of an Opinion issued for Korean Patent Application No. 10-2024-7020635, dated Aug. 7, 2024, 15 pages including English machine translation.
(Continued)

*Primary Examiner* — Jonathan Y Jung
(74) *Attorney, Agent, or Firm* — HSML P.C.

(57) ABSTRACT

Provided is an optical film which has high anti-glare properties, enables a suppress of a reduction in jet-black appearance by reflected scattered light, and has favorable scratch resistance. An optical film having a surface with depressions and projections, wherein the surface with depressions and projections has a peak material volume Vmp of 0.010 ml/m² or more and 0.050 ml/m² or less specified in ISO 25178-2:2012, and a minimum autocorrelation length Sal of 4.0 μm or more and 12.0 μm or less specified in ISO 25178-2:2012.

20 Claims, 1 Drawing Sheet

(56) References Cited

U.S. PATENT DOCUMENTS

| | | | |
|---|---|---|---|
| 2017/0023705 A1* | 1/2017 | Sahara | B24C 1/06 |
| 2018/0233633 A1 | 8/2018 | Yamanaka et al. | |
| 2018/0239066 A1* | 8/2018 | Tachibana | G02B 5/0858 |
| 2018/0364400 A1 | 12/2018 | Eguchi et al. | |
| 2020/0166677 A1 | 5/2020 | Sugawara | |
| 2020/0166678 A1 | 5/2020 | Sugawara et al. | |
| 2022/0365246 A1 | 11/2022 | Sugawara | |

FOREIGN PATENT DOCUMENTS

| | | | | |
|---|---|---|---|---|
| JP | 2016126023 A | | 7/2016 | |
| JP | 2017134094 A | | 8/2017 | |
| JP | 2020173452 A | | 10/2020 | |
| KR | 1020210090240 A | | 7/2021 | |
| WO | WO-2007129609 A1 | * | 11/2007 | G02B 5/045 |
| WO | 2017057564 A1 | | 4/2017 | |
| WO | 2017061493 A1 | | 4/2017 | |
| WO | 2017068765 A1 | | 4/2017 | |
| WO | 2019026466 A1 | | 2/2019 | |
| WO | 2019026471 A1 | | 2/2019 | |
| WO | 2021075082 A1 | | 4/2021 | |

OTHER PUBLICATIONS

International Search Report issued for International Patent Application No. PCT/JP2023/016223, Date of mailing: Jul. 18, 2023, 7 pages including English translation.

Written Opinion issued for International Patent Application No. PCT/JP2023/016223, Date of mailing: Jul. 18, 2023, 15 pages including English machine translation.

Notice of Reasons for Refusal issued for Japanese Patent Application No. 2022-073216, Dispatch date: Aug. 23, 2022, 11 pages including English machine translation.

Rejection Decision issued for Japanese Patent Application No. 2022-073216, Dispatch date: Jan. 10, 2023, 8 pages including English machine translation.

Notice of Reasons for Refusal issued for Japanese Patent Application No. 2023-547625, Dispatch date: Oct. 3, 2023, 6 pages including English machine translation.

Decision to Grant a Patent issued for Japanese Patent Application No. 2023-547625, Dispatch date: Nov. 21, 2023, 3 pages including English machine translation.

* cited by examiner

[Fig. 1]
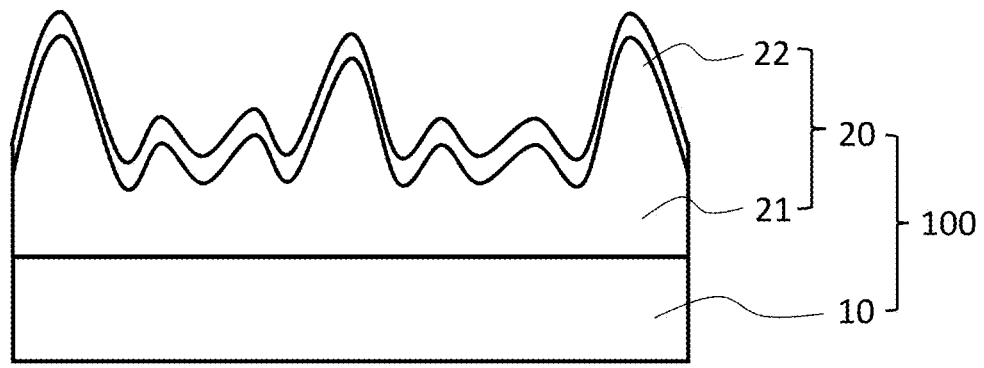
[Fig. 2]
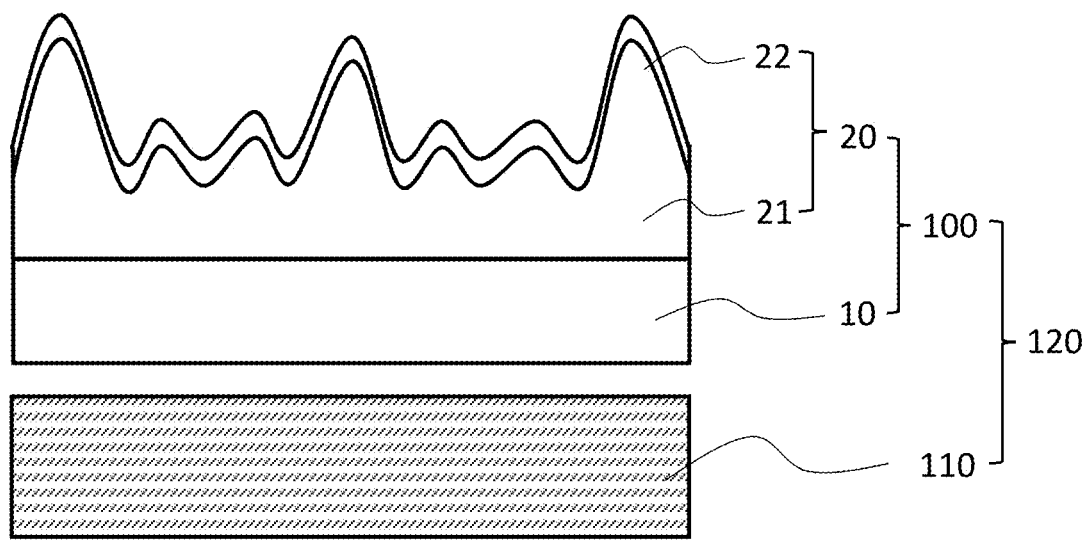

OPTICAL FILM, IMAGE DISPLAY PANEL, AND IMAGE DISPLAY DEVICE

TECHNICAL FIELD

The present disclosure relates to an optical film, an image display panel, and an image display device.

BACKGROUND ART

In image display devices such as televisions, laptop computers, and monitors for desktop computers, an optical film having a surface with depressions and projections may be disposed on their surfaces to suppress reflections of backgrounds such as lighting and people.

Such optical films having a surface with depressions and projections are disclosed in Patent Literature 1 to 2, for example.

CITATION LIST

Patent Literature

PTL 1: WO 2019/026466
PTL 2: WO 2019/026471

SUMMARY OF INVENTION

Technical Problem

In traditional optical films, predetermined anti-glare properties can be imparted to the optical films by forming larger depressions and projections on the surface of the optical film. However, in the optical films having larger depressions and projections on the surfaces, the jet-black appearance of the black display portions of images may be reduced by reflected scattered light in some cases. Furthermore, the optical films having larger depressions and projections on the surfaces may have reduced scratch resistance in some cases.

In the optical films according to PTLs 1 to 2, the reduction in jet-black appearance by reflected scattered light and scratch resistance are not examined at all.

An object of the present disclosure is to provide an optical film which has high anti-glare properties, enables a suppression of a reduction in jet-black appearance by reflected scattered light, and has favorable scratch resistance.

Solution to Problem

The present disclosure provides an optical film and an image display panel according to (1) to (2), and a display device below.
(1) An optical film having a surface with depressions and projections, wherein the surface with depressions and projections has a peak material volume Vmp of 0.010 ml/m² or more and 0.050 ml/m² or less specified in ISO 25178-2:2012, and a minimum autocorrelation length Sal of 4.0 µm or more and 12.0 µm or less specified in ISO 25178-2:2012.
(2) An image display panel comprising a display element and the optical film according to (1) above, wherein the optical film is disposed on the display element such that the surface with depressions and projections of the optical film faces the side opposite to the display element, and the optical film is disposed on the topmost surface.
(3) An image display device comprising the image display panel according to (2).

Advantageous Effects of Invention

The optical film, the image display panel, and the image display device according to the present disclosure can have high anti-glare properties, enable a suppression of a reduction in jet-black appearance by reflected scattered light, and can have favorable scratch resistance.

BRIEF DESCRIPTION OF DRAWINGS

FIG. 1 is a cross-sectional schematic view illustrating one embodiment of an optical film according to the present disclosure.

FIG. 2 is a cross-sectional view illustrating one embodiment of an image display panel according to the present disclosure.

DESCRIPTION OF EMBODIMENTS

Hereinafter, embodiments according to the present disclosure will be described.
[Optical Film]

The optical film according to the present disclosure has a surface with depressions and projections,
wherein the surface with depressions and projections has a peak material volume Vmp of 0.010 ml/m² or more and 0.050 ml/m² or less specified in ISO 25178-2:2012, and a minimum autocorrelation length Sal of 4.0 µm or more and 12.0 µm or less specified in ISO 25178-2:2012.

FIG. 1 is a cross-sectional schematic view of a cross-sectional profile of an optical film 100 according to the present disclosure.

The optical film 100 shown in FIG. 1 has a surface with depressions and projections. The optical film 100 shown in FIG. 1 includes a functional layer 20 on a substrate 10, and the surface of the functional layer 20 corresponds to the surface with depressions and projections of the optical film. The functional layer 20 shown in FIG. 1 includes an anti-glare layer 21 and an anti-reflection layer 22.

FIG. 1 is a schematic sectional view. In other words, scales of the layers constituting the optical film 100 and scales of the surface with depressions and projections are schematic for easy illustrations, and are different from actual scales. The same is applied to FIG. 2.

The optical film according to the present disclosure can have any laminate configuration other than that in FIG. 1 as long as the Vmp and Sal of the surface with depressions and projections fall within predetermined ranges. For example, the optical film may have a monolayer structure composed of an anti-glare layer, may have a two-layer structure composed of a substrate and an anti-glare layer, or may include a functional layer other than the anti-glare layer and the anti-reflection layer.

A preferred embodiment of the optical film includes a functional layer on the substrate, and the surface of the functional layer corresponds to the surface with depressions and projections. A more preferred embodiment of the optical film includes an anti-glare layer as the functional layer, and the surface of the anti-glare layer corresponds to the surface with depressions and projections. A still more preferred embodiment of the optical film includes an anti-glare layer and an anti-reflection layer as the functional layers, and the surface of the anti-reflection layer corresponds to the surface with depressions and projections.

<Surface with Depressions and Projections>

The optical film needs to have a surface with depressions and projections.

The surface with depressions and projections of the optical film needs to have a peak material volume Vmp of 0.010 ml/m$^2$ or more and 0.050 ml/m$^2$ or less specified in ISO 25178-2:2012, and a minimum autocorrelation length Sal of 4.0 μm or more and 12.0 μm or less specified in ISO 25178-2:2012.

The Vmp is a parameter indicating the volume of a projected portion having a height higher than the core portion. The core portion corresponds to a portion having an average height in the surface with depressions and projections. A larger Vmp indicates that the portion projected from the core portion has a larger volume. Even if the "arithmetic mean height Sa" described later of the surface with depressions and projections is the same, the Vmp of the surface with depressions and projections tends to be larger as the height of the portion projected from the core portion is higher.

In this specification, "the portion projected from the core portion" may be referred to as "projected portion" in some cases.

In this specification, the Vmp and the Vvc described later are calculated where the areal material ratio that separates the core portion and the reduced peak is 10% and the areal material ratio that separates the core portion and the reduced dale is 80%. In other words, in this specification, the "Vmp" indicates the "peak material volume where the areal material ratio that separates the core portion and the reduced peak is 10%", and the "Vvc" indicates the "core void volume where the areal material ratio that separates the core portion and the reduced dale is 80%".

Sal is a parameter where the traverse direction is focused. A smaller Sal indicates that the surface with depressions and projections has denser depressions and projections, and a larger Sal indicates that the surface with depressions and projections has depressions and projections with wider intervals. The value of the "mean length of the roughness profile elements RSm" specified in JIS B0601 is hardly affected by fine depressions and projections, and is affected only by large depressions and projections. In contrast, unlike the RSm, the value of Sal is affected not only by large depressions and projections but also by fine depressions and projections. Moreover, in spite of wider intervals between depressions and projections, the Sal tends to reduce if projections are small or depressions and projections forms a complex profile. Moreover, the Sal tends to increase if projections have a monotonous profile.

When the Vmp is less than 0.010 ml/m$^2$, the shape of the surface with depressions and projections indicates that the projected portions have a small volume. When the volume is small, reflected scattered light of the surface with depressions and projections is increased, and favorable jet-black appearance cannot be obtained. When the Vmp is less than 0.010 ml/m$^2$, anti-glare properties also tend to be reduced. In contrast, when the Vmp is 0.010 ml/m$^2$ or more, reflected scattered light of the surface with depressions and projections can be suppressed, and therefore favorable jet-black appearance can be obtained. When the Vmp is 0.010 ml/m$^2$ or more, favorable anti-glare properties can be obtained.

When the Vmp is 0.010 ml/m$^2$ or more but the Sal is more than 12.0 μm, favorable jet-black appearance cannot be obtained.

It is considered that the surface with depressions and projections having a Vmp of 0.010 ml/m$^2$ or more and an Sal of 12.0 μm or less can provide favorable jet-black appearance by the actions x1 to x4 below.

A case where the optical film according to the present disclosure is disposed on an image display device, as a precondition, will be considered.

x1: Light enters the surface with depressions and projections. Hereinafter, the light entering the surface with depressions and projections is referred to as incident light in some cases. The direction of light entering the surface with depressions and projections is referred to as first direction in some cases. The direction opposite to the first direction is referred to as second direction in some cases. An observer is present in the second direction.

x2: Part of the incident light reflects from the surface with depressions and projections.

x3: Part of the reflected light reflected from the surface with depressions and projections collides with protrusions of the surface with depressions and projections. As the Vmp is larger and the Sal is smaller, the proportion of the reflected light colliding with protrusions of the surface with depressions and projections is increased. In contrast, as the Vmp is smaller and the Sal is larger, the proportion of the reflected light colliding with protrusions of the surface with depressions and projections is reduced.

x4: Part of the reflected light colliding with protrusions is repeatedly subjected to total internal reflection within the protrusions to advance toward the image display device side. The light advancing toward the image display device side is absorbed by the image display device, and is not recognized by the observer as reflected scattered light. For this reason, the surface with depressions and projections having a large Vmp and a small Sal can suppress reflected scattered light and can provide favorable jet-black appearance.

A Vmp of more than 0.050 ml/m$^2$ indicates a large volume of the projected portions. Portions of the surface with depressions and projections scratched by friction are mainly the vicinity of the protrusions, and particularly, the vicinity of protrusions having a high height is readily scratched. For this reason, when the Vmp is more than 0.050 ml/m$^2$, favorable scratch resistance of the surface with depressions and projections cannot be obtained.

When the Vmp is 0.050 ml/m$^2$ or less but the Sal is less than 4.0 μm, favorable scratch resistance cannot be obtained. Portions of the surface with depressions and projections scratched by friction are mainly the vicinity of the protrusions. When the Sal is less than 4.0 μm, the number of protrusions of the surface with depressions and projections increases, and thus the surface with depressions and projections is readily scratched. For this reason, when the Vmp is 0.050 ml/m$^2$ or less but the Sal is less than 4.0 μm, favorable scratch resistance cannot be obtained.

The lower limit of the Vmp is preferably 0.020 ml/m$^2$ or more, more preferably 0.025 ml/m$^2$ or more, still more preferably 0.030 ml/m$^2$ or more. The upper limit of the Vmp is preferably 0.040 ml/m$^2$ or less, more preferably 0.035 ml/m$^2$ or less.

As an embodiment of the range of the Vmp, examples thereof include 0.010 ml/m$^2$ or more and 0.050 ml/m$^2$ or less, 0.010 ml/m$^2$ or more and 0.040 ml/m$^2$ or less, 0.010 ml/m$^2$ or more and 0.035 ml/m$^2$ or less, 0.020 ml/m$^2$ or more and 0.050 ml/m$^2$ or less, 0.020 ml/m$^2$ or more and 0.040 ml/m$^2$ or less, 0.020 ml/m$^2$ or more and 0.035 ml/m$^2$ or less, 0.025 ml/m$^2$ or more and 0.050 ml/m$^2$ or less, 0.025 ml/m$^2$ or more and 0.040 ml/m$^2$ or less, 0.025 ml/m$^2$ or more and 0.035 ml/m$^2$ or less, 0.030 ml/m$^2$ or more and 0.050 ml/m$^2$ or less, 0.030 ml/m$^2$ or more and 0.040 ml/m$^2$ or less, and 0.030 ml/m$^2$ or more and 0.035 ml/m$^2$ or less.

The lower limit of the Sal is preferably 5.0 µm or more, more preferably 6.0 µm or more, still more preferably 6.5 µm or more, further still more preferably 7.0 µm or more. The upper limit of the Sal is preferably 11.0 µm or less, more preferably 10.5 µm or less, still more preferably 10.0 µm or less.

As an embodiment of the range of the Sal, examples thereof include 4.0 µm or more and 12.0 µm or less, 4.0 µm or more and 11.0 µm or less, 4.0 µm or more and 10.5 µm or less, 4.0 µm or more and 10.0 µm or less, 5.0 µm or more and 12.0 µm or less, 5.0 µm or more and 11.0 µm or less, 5.0 µm or more and 10.5 µm or less, 5.0 µm or more and 10.0 µm or less, 6.0 µm or more and 12.0 µm or less, 6.0 µm or more and 11.0 µm or less, 6.0 µm or more and 10.5 µm or less, 6.0 µm or more and 10.0 µm or less, 6.5 µm or more and 12.0 µm or less, 6.5 µm or more and 11.0 µm or less, 6.5 µm or more and 10.5 µm or less, 6.5 µm or more and 10.0 µm or less, 7.0 µm or more and 12.0 µm or less, 7.0 µm or more and 11.0 µm or less, 7.0 µm or more and 10.5 µm or less, and 7.0 µm or more and 10.0 µm or less.

The Vmp and the Sal, and the Vvc, Sxp, and Sa described later are measured with a confocal laser microscope. Examples of the confocal laser microscope include "VK-X" series available from Keyence Corporation. The Vmp, Sal, Sxp, and Sa can be simply calculated using "Multi-file analysis application" of "VK-X" series described above.

When the Vmp, Sal, Sxp, and Sa are measured using the "VK-X" series described above, the measurement is preferably performed according to the conditions described in Examples. For example, F-operation is preferably plane tilt correction (region specified). The region to be measured preferably has a side of 50 µm to 200 µm, and the measurement points per side are preferably 500 points or more and 2000 points or less.

In the optical film according to the present disclosure, the core void volume Vvc of the surface with depressions and projections specified in ISO 25178-2:2012 is preferably 0.30 ml/m$^2$ or more and 1.00 ml/m$^2$ or less. The Vvc is a parameter indicating the core void volume. It can be said that the core portion is substantially the volume of water collected in the depressions and projections forming the core portion of the surface with depressions and projections when water is dropped onto the surface with depressions and projections.

By controlling the Vvc to 0.30 ml/m$^2$ or more, more favorable anti-glare properties are likely to be obtained. By controlling the Vvc to 1.00 ml/m$^2$ or less, more favorable scratch resistance is likely to be obtained.

The lower limit of the Vvc is preferably 0.35 ml/m$^2$ or more, more preferably 0.40 ml/m$^2$ or more, still more preferably 0.50 ml/m$^2$ or more. The upper limit of the Vvc is preferably 0.90 ml/m$^2$ or less, more preferably 0.80 ml/m$^2$ or less, still more preferably 0.70 ml/m$^2$ or less, further still more preferably 0.65 ml/m$^2$ or less.

As an embodiment of the range of the Vvc, examples thereof include 0.30 ml/m$^2$ or more and 1.00 ml/m$^2$ or less, 0.30 ml/m$^2$ or more and 0.90 ml/m$^2$ or less, 0.30 ml/m$^2$ or more and 0.80 ml/m$^2$ or less, 0.30 ml/m$^2$ or more and 0.70 ml/m$^2$ or less, 0.30 ml/m$^2$ or more and 0.65 ml/m$^2$ or less, 0.35 ml/m$^2$ or more and 1.00 ml/m$^2$ or less, 0.35 ml/m$^2$ or more and 0.90 ml/m$^2$ or less, 0.35 ml/m$^2$ or more and 0.80 ml/m$^2$ or less, 0.35 ml/m$^2$ or more and 0.70 ml/m$^2$ or less, 0.35 ml/m$^2$ or more and 0.65 ml/m$^2$ or less, 0.40 ml/m$^2$ or more and 1.00 ml/m$^2$ or less, 0.40 ml/m$^2$ or more and 0.90 m/m$^2$ or less, 0.40 ml/m$^2$ or more and 0.80 ml/m$^2$ or less, 0.40 ml/m$^2$ or more and 0.70 ml/m$^2$ or less, 0.40 ml/m$^2$ or more and 0.65 ml/m$^2$ or less, 0.50 ml/m$^2$ or more and 1.00 ml/m$^2$ or less, 0.50 ml/m$^2$ or more and 0.90 ml/m$^2$ or less, 0.50 ml/m$^2$ or more and 0.80 ml/m$^2$ or less, 0.50 ml/m$^2$ or more and 0.70 ml/m$^2$ or less, and 0.50 ml/m$^2$ or more and 0.65 ml/m$^2$ or less.

In the optical film according to the present disclosure, the peak extreme height Sxp of the surface with depressions and projections specified in ISO 25178-2:2012 is preferably 0.55 µm or more and 2.00 µm or less. The Sxp is a parameter indicating the difference between the average plane of the surface with depressions and projections and the protrusions after protrusions having a particularly high height in the surface with depressions and projections are removed. The lower limit of the Sxp is preferably 0.65 µm or more, more preferably 0.80 µm or more, still more preferably 0.90 µm or more. The upper limit of the Sxp is preferably 1.75 µm or less, more preferably 1.60 µm or less, still more preferably 1.35 µm or less, further still more preferably 1.20 µm or less.

By controlling the Sxp to 0.55 µm or more, more favorable anti-glare properties are likely to be obtained. By controlling the Sxp to 2.00 µm or less, more favorable scratch resistance is likely to be obtained.

As an embodiment of the range of the Sxp, examples thereof include 0.55 µm or more and 2.00 µm or less, 0.55 µm or more and 1.75 µm or less, 0.55 µm or more and 1.60 µm or less, 0.55 µm or more and 1.35 µm or less, 0.55 µm or more and 1.20 µm or less, 0.65 µm or more and 2.00 µm or less, 0.65 µm or more and 1.75 µm or less, 0.65 µm or more and 1.60 µm or less, 0.65 µm or more and 1.35 µm or less, 0.65 µm or more and 1.20 µm or less, 0.80 µm or more and 2.00 µm or less, 0.80 µm or more and 1.75 µm or less, 0.80 µm or more and 1.60 µm or less, 0.80 µm or more and 1.35 µm or less, 0.80 µm or more and 1.20 µm or less, 0.90 µm or more and 2.00 µm or less, 0.90 µm or more and 1.75 µm or less, 0.90 µm or more and 1.60 µm or less, 0.90 µm or more and 1.35 µm or less, and 0.90 µm or more and 1.20 µm or less.

In this specification, the Sxp indicates the difference between the height in an areal material ratio of 2.5% and the height in an areal material ratio of 50%.

In the optical film according to the present disclosure, the arithmetic mean height Sa of the surface with depressions and projections specified in ISO 25178-2:2012 is preferably 0.20 µm or more and 1.00 µm or less. The lower limit of the Sa is preferably 0.25 µm or more, more preferably 0.30 µm or more, still more preferably 0.32 µm or more. The upper limit of the Sa is preferably 0.80 µm or less, more preferably 0.60 µm or less, still more preferably 0.40 µm or less.

By controlling the Sa to 0.20 µm or more, more favorable anti-glare properties are likely to be obtained. By controlling the Sa to 1.00 µm or less, more favorable scratch resistance is likely to be obtained.

As an embodiment of the range of the Sa, examples thereof include 0.20 µm or more and 1.00 µm or less, 0.20 µm or more and 0.80 µm or less, 0.20 µm or more and 0.60 µm or less, 0.20 µm or more and 0.40 µm or less, 0.25 µm or more and 1.00 µm or less, 0.25 µm or more and 0.80 µm or less, 0.25 µm or more and 0.60 µm or less, 0.25 µm or more and 0.40 µm or less, 0.30 µm or more and 1.00 µm or less, 0.30 µm or more and 0.80 µm or less, 0.30 µm or more and 0.60 µm or less, 0.30 µm or more and 0.40 µm or less, 0.32 µm or more and 1.00 µm or less, 0.32 µm or more and 0.80 µm or less, 0.32 µm or more and 0.60 µm or less, and 0.32 µm or more and 0.40 µm or less.

In this specification, unless otherwise specified, the surface profiles (Vmp, Sal, Vvc, Sxp, and Sa), and the optical physical properties (such as haze, and total light transmittance) each indicate the average of the measured values at 16 points.

In this specification, for the 16 measured points, a region of 1 cm from the outer edge is removed as a margin from the sample to be measured, and the remaining region is divided equally into 5 in the longitudinal direction and the traverse direction. At this time, 16 points of intersection are used as measurement centers. For example, when the sample to be measured is a rectangle, regions of 0.5 cm from the outer edges of the rectangle are removed as margins, and the remaining region is equally divided into 5 in the longitudinal direction and the traverse direction, and is measured where 16 points of intersection with the dotted lines are used as centers. Then, using the average, the parameter is calculated. When the sample to be measured has a shape other than a rectangular shape such as a circular shape, an oval shape, a triangular shape, or a pentagonal shape, the inscribed rectangle of each shape can be drawn, and 16 points of the rectangle can be measured by the above-mentioned method.

In this specification, unless otherwise specified, the surface profiles (Vmp, Sal, Vvc, Sxp, and Sa), optical physical properties (such as haze, and total light transmittance) are measured at a temperature of 23±5° C. and a relative humidity of 40% or more and 65% or less. Before each of the measurements thereof is started, the target sample is exposed to the atmosphere for 30 minutes or more and 60 minutes or less to perform the measurement.

<Substrate>

The optical film preferably includes a substrate for easy production of the optical film and handling properties of the optical film.

Preferably, the substrate has light transmissivity, smoothness, and heat resistance, and further has high mechanical strength. Examples of such a substrate include plastic films of polyester, triacetylcellulose (TAC), cellulose diacetate, cellulose acetate butyrate, polyamide, polyimide, polyether sulfone, polysulfone, polypropylene, polymethylpentene, polyvinyl chloride, polyvinyl acetal, polyether ketone, polymethyl methacrylate, polycarbonate, polyurethane, and amorphous olefin (Cyclo-Olefin-Polymer: COP). The substrate may be two or more plastic films bonded to each other.

Among these plastic films, stretched polyester films are preferred, and biaxially stretched polyester films are more preferred for mechanical strength and dimensional stability. Examples of polyester films include polyethylene terephthalate films and polyethylene naphthalate films. TAC films and acrylic films are suitable because favorable light transmissivity and optical isotropy are readily obtained. COP films and polyester films are suitable for their high weatherability.

The substrate has a thickness of preferably 5 μm or more and 300 μm or less, more preferably 20 μm or more and 200 μm or less, still more preferably 30 μm or more and 120 μm or less.

When the optical film is formed into a thin film, a preferred upper limit of the thickness of the substrate is 100 μm or less, and a more preferred upper limit is 80 μm or less. When the substrate is a low moisture-permeable substrate made of polyester, COP, acrylic resin, or the like, a preferred upper limit of the thickness of the substrate for formation of a thin film is 60 μm or less, and a more preferred upper limit is 40 μm or less. Even in the case of large screens, distortions are difficult to occur as long as the upper limit of the thickness of the substrate falls within the ranges specified above, which is also suitable.

The thickness of the substrate can be measured by a film thickness measurement apparatus, for example. Examples of the film thickness measurement apparatus include Standard Digimatic Outside Micrometer (product No. MDC-25SX) available from Mitutoyo Corporation. As the thickness of the substrate, it is sufficient that the average of thicknesses measured at any 10 points is the above numeric value.

The substrate has a total light transmittance specified in JIS K7361-1:1997 of preferably 70% or more, more preferably 80% or more, still more preferably 85% or more.

The substrate has a haze specified in JIS K7136:2000 of preferably 10% or less, more preferably 5% or less, still more preferably 3% or less.

To improve adhesiveness, the surface of the substrate may be subjected to a physical treatment such as a corona discharge treatment, or a chemical treatment. The substrate may comprise an easily adhesive layer on the surface thereof.

<Functional Layer>

Preferably, the optical film includes a functional layer on the substrate, and the surface of the functional layer is the surface with depressions and projections. Examples of the functional layer include an anti-glare layer, an anti-reflection layer, an antistatic layer, and an antifouling layer.

More preferably, the optical film includes an anti-glare layer as a functional layer, and the surface of the anti-glare layer is the surface with depressions and projections. Still more preferably, the optical film includes an anti-glare layer and an anti-reflection layer as the functional layers, and the surface of the anti-reflection layer is the surface with depressions and projections.

<<Anti-Glare Layer>>

The anti-glare layer is a layer which plays a main role in contributing to anti-glare properties.

The anti-glare layer can be formed, for example, by (A) a method using an emboss roll, (B) an etching treatment, (C) molding using a mold, and (D) forming a coating by application. Among these methods, (C) molding using a mold is suitable to readily obtain a stable profile of the surface, and (D) forming a coating by application is suitable for productivity and support for a variety of kinds of products.

In the method (C), for example, the anti-glare layer can be formed by casting a resin into a mold, and removing the molded resin from the mold. The mold to be used is a mold having the inverted surface profile with respect to that of the anti-glare layer. Such a mold can be prepared, for example, by a method (c1-1) to (c1-2) or by a method (c2) below.

(c1-1) A profile where Vmp, Sal, or the like fall within predetermined ranges is created by simulation. Further, the simulated profile is inverted.

(c1-2) A metal is carved by laser light to reflect the inverted profile, thereby obtaining a mold.

(c2) A mold having the inverted profile with respect to that of the anti-glare layer prepared by (D) is obtained by an electroforming method widely used.

When the anti-glare layer is formed by (D), examples of the method include methods (d1) and (d2) below. The method (d1) is preferred to the method (d2) because it can readily adjust the ranges of Vmp and Sal.

(d1) A method of applying a coating solution containing a binder resin and particles, followed by drying to form an anti-glare layer having depressions and projections based on the particles.

(d2) A method of applying a coating solution containing any resin and a resin less compatible with the resin to cause phase separation of the resins, thereby forming depressions and projections.

—Thickness—

For a balance among suppression of curling, mechanical strength, hardness, and toughness, the thickness T of the anti-glare layer is preferably 2.0 µm or more and 10.0 µm or less, more preferably 3.0 µm or more and 8.0 µm or less, still more preferably 4.0 µm or more and 6.0 µm or less.

The thickness of the anti-glare layer can be determined, for example, by selecting any 20 points in a cross-sectional photograph of the optical film taken by a scanning transmissive electron microscope, and calculating the average thereof. Preferably, the STEM is set at an accelerating voltage of 10 kV or more and 30 kV or less and a magnification of 1000× or more and 7000× or less.

—Components—

Preferably, the anti-glare layer mainly contains a resin component. Further, the anti-glare layer preferably contains particles such as organic particles and inorganic particles, fine particles in unit of nanometer, and additives such as a refractive index adjuster, an antistatic agent, an antifouling agent, an ultraviolet absorbing agent, a light stabilizer, an antioxidant, a viscosity control agent, and a thermal polymerization initiator.

The anti-glare layer preferably contains a binder resin and particles.

Examples of the particles include organic particles and inorganic particles. Preferred are inorganic particles. In other words, the anti-glare layer preferably contains a binder resin and inorganic particles. More preferably, the anti-glare layer contains a binder resin, inorganic particles, and organic particles.

—Particles—

Examples of inorganic particles include silica, alumina, zirconia, and titania. Preferred is silica. Among these inorganic particles, preferred are amorphous inorganic particles, and more preferred is amorphous silica.

Examples of organic particles include particles containing one or more resins selected from the group consisting of polymethyl methacrylate, polyacrylic-styrene copolymers, melamine resins, polycarbonate, polystyrene, polyvinyl chloride, benzoguanamine-melamine-formaldehyde condensate, silicone, fluorine-based resins, and polyester-based resins.

Preferably, the particles do not contain particles having a large aspect ratio. The particles having a large aspect ratio are likely to project from the surface of the anti-glare layer, and thus may reduce the scratch resistance in some cases. Specifically, the particles preferably contain no particles having an aspect ratio of 10 or more, and more preferably contain no particles having an aspect ratio of 5 or more.

The amorphous inorganic particles indicate inorganic particles without any specific shape which are obtained by grinding large-sized inorganic particles, followed by classification.

The particles preferably contain inorganic particles. The particles more preferably contain amorphous inorganic particles, and still more preferably contain amorphous inorganic particles and organic particles. As the amorphous inorganic particles, preferred is amorphous silica.

Compared to spherical particles, amorphous inorganic particles tend to more readily increase the Vmp and reduce the Sal. However, amorphous inorganic particles having particle diameters distribution in an excessively narrow range may lead to an insufficiently large Vmp or may lead to an excessively small Sal in some cases. For this reason, the amorphous inorganic particles preferably have a volume-based cumulative distribution of the particle diameter within the range described later. However, use of inorganic particles alone is likely to readily cause aggregation. Thus, to facilitate control of the Vmp and the Sal to the ranges specified above, the particles preferably contain amorphous inorganic particles having a predetermined particle diameter distribution and organic particles.

Inorganic particles such as amorphous inorganic particles have a volume-based cumulative distribution d10 of the particle diameter, a volume-based cumulative distribution d50 of the particle diameter, and a volume-based cumulative distribution d90 of the particle diameter, these cumulative distributions satisfying the relations (1) and (2) below:

$$1.5 \le d50/d10 \le 4.0 \quad (1)$$

$$1.0 \le d90/d50 \le 3.0 \quad (2)$$

A value of d50/d10 of 1.5 or more indicates that the inorganic particles have a wide particle size distribution in a region where the particle diameter is the mean or smaller. By controlling the value of d50/d10 to 1.5 or more, fine depressions and projections are likely to be formed on the surface with depressions and projections, thus reducing the Sal. By controlling the value of d50/d10 to 4.0 or less, an increase in amount of inorganic particles buried in the anti-glare layer can be suppressed, enhancing the efficiency in addition of the inorganic particles.

A value of d90/d50 of 1.0 or more indicates that the inorganic particles has a wide particle size distribution in a region where the particle diameter is the mean or larger. By controlling the value of d90/d50 to 1.0 or more, the Vmp can be readily increased, and the Sal can be readily increased. By controlling the value of d90/d50 to 3.0 or less, an excessive increase in Vmp and an excessive increase in Sal can be readily suppressed.

The lower limit of the value of d50/d10 is more preferably 2.0 or more, still more preferably 2.3 or more, and the upper limit is more preferably 3.5 or less, still more preferably 3.0 or less.

The lower limit of the value of d90/d50 is more preferably 1.5 or more, still more preferably 1.8 or more, and the upper limit is more preferably 2.5 or less, still more preferably 2.0 or less.

The d10, d50, and d90 of the inorganic particles such as amorphous inorganic particles can be measured by a laser diffraction method.

Inorganic particles such as amorphous inorganic particles have a volume-based cumulative distribution d50 of the particle diameter of preferably 2.9 µm or more and 6.0 µm or less, more preferably 3.5 µm or more and 5.7 µm or less, still more preferably 4.0 µm or more and 5.5 µm or less.

By controlling the d50 to 2.9 µm or more, an excessive increase in the number of inorganic particles can be suppressed, which can facilitate suppression in excessive reduction of the Sal. By controlling the d50 to 6.0 µm or less, an excessive decrease in the number of inorganic particles can be suppressed, which can facilitate suppression in excessive increase of the Sal.

For the thickness T of the anti-glare layer and the d50 of the inorganic particles such as amorphous inorganic particles, the value of d50/T is preferably 0.55 or more and 1.00 or less, more preferably 0.60 or more and 0.95 or less, still more preferably 0.70 or more and 0.90 or less.

Control of the value of d50/T to 0.55 or more can facilitate an increase in Sal. Control of the value of d50/T to 1.00 or less can facilitate a reduction in Sal.

For the thickness T of the anti-glare layer and the d90 of the inorganic particles such as amorphous inorganic particles, the value of d90/T is preferably 1.00 or more and 1.50 or less, more preferably 1.08 or more and 1.45 or less, still more preferably 1.20 or more and 1.40 or less.

Control of the value of d90/T to 1.00 or more can facilitate an increase in Vmp. Control of the value d90/T to 1.50 or less can facilitate a reduction in Vmp.

The content of the inorganic particles such as amorphous inorganic particles is preferably 8 parts by mass or more and 40 parts by mass or less, more preferably 12 parts by mass or more and 30 parts by mass or less, still more preferably 15 parts by mass or more and 28 parts by mass or less relative to 100 parts by mass of the binder resin.

By controlling the content of the inorganic particles such as amorphous inorganic particles to 8 parts by mass or more, an excessive reduction in the number of inorganic particles can be suppressed, and thus an excessive increase in Sal can be readily suppressed.

By controlling the content of the inorganic particles such as amorphous inorganic particles to 40 parts by mass or less, an excessive increase in the number of inorganic particles can be suppressed, and thus an excessive reduction in Sal can be more readily suppressed.

The content of the organic particles is preferably 1 part by mass or more and 25 parts by mass or less, more preferably 3 parts by mass and 18 parts by mass or less, still more preferably 8 parts by mass or more and 14 parts by mass or less relative to 100 parts by mass of the binder resin.

By controlling the content of the organic particles to 1 part by mass or more, aggregation of the inorganic particles can be more readily suppressed. By controlling the content of the organic particles to 1 part by mass or more, an excessive decrease in the number of organic particles can be suppressed, and thus an excessive increase in Vmp and Sal can be readily suppressed.

By controlling the content of the organic particles to 25 parts by mass or less, an excessive increase in the number of organic particles can be suppressed, and thus an excessive reduction in Vmp and Sal can be readily suppressed. Since the organic particles have a relatively uniform particle diameter distribution, an increase in content of the organic particles strongly tends to reduce the Vmp and the Sal.

To be noted, when two or more types of organic particles are contained and the difference in the average particle size among the respective types of organic particles is large, the Vmp and the Sal tend to excessively increase irrespective of the content of the organic particles. For this reason, when two or more types of organic particles are used, the difference in the average particle size among the respective types of organic particles is preferably 1.7 µm or less, more preferably 1.0 µm or less, more preferably 0.5 µm or less, more preferably 0.2 µm or less, more preferably 0.1 µm or less.

The organic particles have an average particle size of preferably 1.0 µm or more and 5.0 µm or less, more preferably 1.2 µm or more and 3.0 µm or less, still more preferably 1.3 µm or more and 2.5 µm or less.

By controlling the average particle size of the organic particles to 1.0 µm or more, an excessive increase in the number of organic particles can be suppressed, and thus an excessive reduction in Vmp and Sal can be readily suppressed. By controlling the average particle size of the organic particles to 5.0 µm or less, an excessive decrease in the number of organic particles can be suppressed, and thus an excessive increase in Vmp and Sal can be readily suppressed.

In this specification, the average particle size of the organic particles indicates the value determined by a laser diffraction method as a volume average d50.

The organic particles preferably have a narrow particle size distribution. Specifically, the proportion of organic particles having particle size within ±0.5 µm to the average particle size is preferably 80% by volume or more, more preferably 85% by volume or more, still more preferably 90% or more in the total organic particles. The Vmp and the Sal can be readily controlled within the ranges specified above by increasing the particle size distribution of the inorganic particles such as amorphous inorganic particles while narrowing the particle size distribution of the organic particles.

Examples of the shape of the organic particles include spherical shapes, disk-like shapes, rugby ball-like shapes, and amorphous shapes. Among these shapes, spherical organic particles are preferred because their particle size distribution can be readily controlled.

The ratio of the average particle size of the organic particles to the thickness of the anti-glare layer (average particle size of organic particles/thickness of anti-glare layer) is preferably 0.20 or more and 0.70 or less, more preferably 0.23 or more and 0.50 or less, still more preferably 0.25 or more and 0.35 or less. By controlling the ratio of the average particle size of the organic particles to the thickness of the anti-glare layer within the range, the Vmp, and the Sal can be readily controlled to fall within the ranges specified above.

—Inorganic Fine Particles—

The anti-glare layer may further contain inorganic fine particles in addition to the binder resin and the particles. In this specification, the inorganic fine particles can be distinguished from the above-mentioned particles according to the average particle size.

When the anti-glare layer contains inorganic fine particles, the difference between the refractive index of the particles and those of the compositions other than the particles in the anti-glare layer can be reduced, and the internal haze can be readily reduced.

Examples of the inorganic fine particles include fine particles made of silica, alumina, zirconia, and titania. Among these, suitable is silica because it readily suppresses generation of the internal haze.

The inorganic fine particles have an average particle size of preferably 1 nm or more and 200 nm or less, more preferably 2 nm or more and 100 nm or less, still more preferably 5 nm or more and 50 nm or less.

—Binder Resin—

To readily obtain more favorable scratch resistance, the binder resin preferably contains a cured product of a curable resin composition, such as a cured product of a thermosetting resin composition or a cured product of an ionizing radiation curable-resin composition, and more preferably contains a cured product of an ionizing radiation curable-resin composition.

The binder resin may contain a thermoplastic resin in the range not inhibiting the effects of the present disclosure.

Examples of binder components include inorganic binder components of a silica-based matrix. Preferred are organic binder components. In other words, preferred is a binder resin containing an organic binder component as the binder component for the anti-glare layer according to the present disclosure.

The proportion of the cured product of the curable resin composition is preferably 80% by mass or more, more preferably 90% by mass or more, still more preferably 100% by mass relative to the total amount of the binder resin.

The thermosetting resin composition is a composition containing at least a thermosetting resin, and is a resin composition curable by heating.

Examples of thermosetting resins include acrylic resins, urethane resins, phenol resins, urea melamine resins, epoxy resins, unsaturated polyester resins, and silicone resins. In thermosetting resin composition, a curing agent is added to these curable resins as needed.

The ionizing radiation curable-resin composition is a composition containing a compound having an ionizing radiation-curable functional group (hereinafter, also referred to as "ionizing radiation-curable compound").

Examples of the ionizing radiation-curable functional group include ethylenically unsaturated bonding groups, such as an (meth)acryloyl group, a vinyl group, and an allyl group, an epoxy group, and an oxetanyl group. The ionizing radiation-curable compound is preferably a compound having an ethylenically unsaturated bonding group, more preferably a compound having two or more ethylenically unsaturated bonding groups. Among these, still more preferred are polyfunctional (meth)acrylate compounds having two or more ethylenically unsaturated bonding groups. Either of a monomer or an oligomer of a polyfunctional (meth)acrylate compound can be used.

The ionizing radiation means that having an energy quantum which can polymerize or cross-link molecules, among electromagnetic waves or charged particle beams, and as the ionizing radiation, usually ultraviolet light (UV) or an electron beam (EB) is used. Besides, electromagnetic waves, such as X-rays and γ-rays, and charged particle beams, such as α-rays and ionic lines, can also be used.

Among polyfunctional (meth)acrylate compounds, examples of bifunctional (meth)acrylate monomers include ethylene glycol di(meth)acrylate, bisphenol A tetraethoxy diacrylate, bisphenol A tetrapropoxy diacrylate, and 1,6-hexanediol diacrylate.

Examples of tri- or higher functional (meth)acrylate monomers include trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, and isocyanuric acid-modified tri(meth)acrylate.

These (meth)acrylate monomers above may have a molecule skeleton partially modified. For example, the (meth)acrylate monomers having a molecule skeleton partially modified with ethylene oxide, propylene oxide, caprolactone, isocyanuric acid, an alkyl, a cyclic alkyl, an aromatic, or bisphenol can also be used.

Examples of polyfunctional (meth)acrylate oligomers include acrylate polymers such as urethane (meth)acrylate, epoxy (meth)acrylate, polyester (meth)acrylate, and polyether (meth)acrylate.

For example, urethane (meth)acrylate is prepared by a reaction of a polyhydric alcohol and an organic diisocyanate with hydroxy (meth)acrylate.

Preferred epoxy (meth)acrylates are (meth)acrylates prepared by reacting a tri- or higher functional aromatic epoxy resin, alicyclic epoxy resin, aliphatic epoxy resin, or the like with (meth)acrylic acid, (meth)acrylates prepared by reacting a bi- or higher functional aromatic epoxy resin, alicyclic epoxy resin, aliphatic epoxy resin, or the like with a polybasic acid and (meth)acrylic acid, and (meth)acrylates prepared by reacting a bi- or higher functional aromatic epoxy resin, alicyclic epoxy resin, aliphatic epoxy resin, or the like with phenols and (meth)acrylic acid.

The polyfunctional (meth)acrylate oligomer has a weight average molecular weight of preferably 500 or more and 3000 or less, more preferably 700 or more and 2500 or less.

In this specification, the weight average molecular weight is the average molecular weight determined with respect to standard polystyrenes in measurement by GPC analysis.

In order to adjust the viscosity of the anti-glare layer coating solution, a monofunctional (meth)acrylate as an ionizing radiation-curable compound may be used in combination. Examples of the monofunctional (meth)acrylate include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate, and isobornyl (meth)acrylate.

These ionizing radiation-curable compounds above can be used alone or in combination.

When the ionizing radiation-curable compound is an ultraviolet light-curable compound, the ionizing radiation-curable composition preferably contains additives such as a photopolymerization initiator and a photopolymerization accelerator.

Examples of the photopolymerization initiator include one or more selected from the group consisting of acetophenone, benzophenone, α-hydroxyalkylphenones, Michler's ketone, benzoin, benzyl dimethyl ketal, benzoyl benzoate, α-acyloxime esters, and thioxanthones.

The photopolymerization accelerator can reduce inhibition of polymerization due to air during curing, and accelerate the curing rate. Examples of the accelerator include p-dimethylaminobenzoic acid isoamyl ester and p-dimethylaminobenzoic acid ethyl ester.

When the binder resin contains a cured product of the ionizing radiation curable-resin composition, the ionizing radiation curable-resin composition preferably contains a polyfunctional (meth)acrylate monomer and a polyfunctional (meth)acrylate oligomer.

The mass ratio of the polyfunctional (meth)acrylate monomer and the polyfunctional (meth)acrylate oligomer is preferably 5:95 to 60:40, more preferably 20:80 to 60:40, still more preferably 40:60 to 60:40.

By using the polyfunctional (meth)acrylate monomer in a predetermined or higher proportion, favorable scratch resistance of the anti-glare layer can be readily obtained.

By using the polyfunctional (meth)acrylate oligomer in a predetermined or higher proportion, the viscosity of the coating solution for the anti-glare layer can be increased, readily suppressing sinking of the particles to a lower portion of the anti-glare layer and suppressing flowing down of the binder resin between projections based on the particles. This can facilitate control of the Vmp and the Sal within the ranges specified above. In contrast, when the polyfunctional (meth)acrylate oligomer is used in an excessively high proportion, the strength of the anti-glare layer may be reduced in some cases. When the viscosity of the coating solution for the anti-glare layer is excessively high, the Vmp may be excessively increased or the Sal may be excessively reduced in some cases. For this reason, the ionizing radiation curable-resin composition preferably contains a predetermined amount of the polyfunctional (meth)acrylate oligomer and a predetermined amount of the polyfunctional (meth)acrylate monomer.

To adjust the viscosity and enable dissolution or dispersion of the components, the anti-glare layer coating solution preferably contains a solvent. Because the surface profile of the anti-glare layer after application and drying is varied according to the type of the solvent, it is preferred that the solvent be selected considering the saturated vapor pressure of the solvent, the permeability of the solvent to the substrate, and the like.

Specifically, examples of the solvent include ketones (such as acetone, methyl ethyl ketone, methyl isobutyl ketone (MIBK), and cyclohexanone), ethers (dioxane and tetrahydrofuran), aliphatic hydrocarbons (such as hexane), alicyclic hydrocarbons (such as cyclohexane), aromatic hydrocarbons (such as toluene and xylene), halogenated carbons (such as dichloromethane and dichloroethane), esters (such as methyl acetate, ethyl acetate, and butyl acetate), alcohols (such as isopropanol, butanol, and cyclohexanol), cellosolves (such as methyl cellosolve and ethyl cellosolve), glycol ethers (such as propylene glycol monomethyl ether acetate), cellosolve acetates, sulfoxides (such as dimethyl sulfoxide), and amides (such as dimethylformamide and dimethylacetamide). Mixtures thereof may also be used.

The solvent in the anti-glare layer coating solution preferably contains a solvent having a high evaporation rate, as the main component. A high evaporation rate of the solvent can suppress sinking of the particles to the lower portion of the anti-glare layer, and further can facilitate a suppression in flowing down of the binder resin between projections based on the particles. This can facilitate control of the Vmp and the Sal within the ranges specified above.

The main component indicates that the content of the component is 50% by mass or more relative to the total amount of the solvent, and the content is preferably 70% by mass or more, more preferably 90% by mass or more, still more preferably 97% by mass or more.

In this specification, the solvent having a high evaporation rate indicates a solvent having an evaporation rate of 100 or more where the evaporation rate of butyl acetate is regarded as 100. The evaporation rate of the solvent having a high evaporation rate is more preferably 120 or more and 300 or less, still more preferably 150 or more and 220 or less.

Examples of the solvent having a high evaporation rate include methyl isobutyl ketone (evaporation rate: 160), toluene (evaporation rate: 200), and methyl ethyl ketone (evaporation rate: 370).

On the other hand, examples of a solvent having a low evaporation rate of less than 100 include cyclohexanone (evaporation rate: 32) and propylene glycol monomethyl ether acetate (evaporation rate: 44).

The drying conditions are preferably controlled when the anti-glare layer is formed from the anti-glare layer coating solution.

The drying conditions can be controlled by the drying temperature and the air rate inside the dryer. The drying temperature is preferably 30° C. or more and 120° C. or less, and the air rate for drying is preferably 0.2 m/s or more and 50 m/s or less. To control the surface profile of the anti-glare layer by drying, irradiation with the ionizing radiation is suitably performed after the drying of the coating solution.

As the drying conditions, drying is preferably performed in two stages at a temperature and an air rate in the ranges specified above. Preferably, the drying in the second stage is performed at a higher drying temperature and a higher air rate than those in the drying in the first stage. Slow drying in the first stage can facilitate reflection of shapes of the amorphous inorganic particles on the surface of the binder resin when the surfaces of the amorphous inorganic particles are covered with the binder resin. By setting the drying temperature and the air rate in the second stage higher than those in the drying in the first stage, aggregation of the organic particles can be readily suppressed. Thus, such two-step drying can facilitate control of the Vmp and the Sal within the ranges specified above.

In the drying in the first stage, preferably, the drying temperature is 30° C. or more and less than 60° C., and the air rate for drying is 0.2 m/s or more and less than 7 m/s. In the drying in the second stage, preferably, the drying temperature is 60° C. or more and 120° C. or less, and the air rate for drying is 7 m/s or more and 50 m/s or less.

<<Anti-Reflection Layer>>

The functional layer preferably includes an anti-reflection layer to provide more favorable anti-glare properties.

The surface of the anti-reflection layer is preferably the surface with depressions and projections of the optical film.

Examples of anti-reflection layers include those having a monolayer structure constituted with a low-refractive index layer; those having a two-layered structure constituted with a high-refractive index layer and a low-refractive index layer; and those having a multilayer structure such as a three or more layered structure. The low-refractive index layer and the high-refractive index layer can be formed by a wet or dry process widely used. In the wet process, preferred are the monolayer structure or the two-layered structure. In the dry process, preferred is the multilayer structure.

The wet process is more excellent than the dry process with respect to production efficiency and resistance against chemicals.

—Case of Monolayer Structure or Two-Layered Structure—

The monolayer structure is constituted with a monolayer of a low-refractive index layer, and the two-layered structure is constituted with a high-refractive index layer and a low-refractive index layer. The monolayer structure or the two-layered structure is preferably formed by a wet process.

Examples of a method of forming the anti-reflection layer by a wet process include a method of forming the anti-reflection layer by a sol-gel method using a metal alkoxide or the like, a method of forming the anti-reflection layer by applying a low-refractive index resin such as a fluorinated resin, and a method of forming the anti-reflection layer by applying a coating solution containing low-refractive index particles or high-refractive index particles to a binder resin composition.

Among these wet processes, formation of the anti-reflection layer with a coating solution containing low-refractive index particles or high-refractive index particles to the binder resin composition is preferred for adhesion and scratch resistance. In other words, the low-refractive index layer preferably contains a binder resin and low-refractive index particles. The high-refractive index layer preferably contains a binder resin and high-refractive index particles.

The low-refractive index layer is preferably disposed on the topmost surface of the optical film.

When antifouling property is imparted to the low-refractive index layer, preferably, an antifouling agent such as a silicone-based compound and a fluorine-based compound is contained in the low-refractive index layer.

The lower limit of the refractive index of the low-refractive index layer is preferably 1.10 or more, more preferably 1.20 or more, still more preferably 1.26 or more, further still more preferably 1.28 or more, further still more preferably 1.30 or more, and the upper limit is preferably 1.48 or less, more preferably 1.45 or less, still more preferably 1.40 or less, further still more preferably 1.38 or less, further still more preferably 1.32 or less.

In this specification, the refractive index indicates the value at a wavelength of 550 nm.

The lower limit of the thickness of the low-refractive index layer is preferably 80 nm or more, more preferably 85 nm or more, still more preferably 90 nm or more, and the upper limit is preferably 150 nm or less, more preferably 110 nm or less, still more preferably 105 nm or less.

To obtain more favorable scratch resistance, the binder resin for the low-refractive index layer preferably contains a cured product of a curable resin composition, such as a cured product of a thermosetting resin composition or a cured product of an ionizing radiation curable-resin composition, and more preferably contains a cured product of an ionizing radiation curable-resin composition.

The binder resin for the low-refractive index layer may contain a thermoplastic resin in the range not inhibiting the effects of the present disclosure.

Examples of the cured product of the curable resin composition for the low-refractive index layer include the same cured products of the curable resin compositions as those listed for the anti-glare layer.

The proportion of the cured product of the curable resin composition is preferably 80% by mass or more, more preferably 90% by mass or more, still more preferably 97% by mass or more relative to the total amount of the binder resin for the low-refractive index layer.

The binder resin for the low-refractive index layer may contain a thermoplastic resin. The binder resin, when containing a thermoplastic resin, can increase the viscosity of the coating solution for a low-refractive index layer, obstructing flowing down of the coating solution for a low-refractive index layer between projections of the anti-glare layer. In other words, when a thermoplastic resin is contained as the binder resin, the surface profile of the anti-glare layer is readily maintained even if the low-refractive index layer is formed on the anti-glare layer, and therefore the Vmp and the Sal can be readily controlled within the ranges specified above. In contrast, when the viscosity of the coating solution for a low-refractive index layer is excessively increased, the Vmp may be excessively increased or the Sal may be excessively reduced in some cases.

For the above-mentioned action and coating strength, the content of the thermoplastic resin is preferably 0.1% by mass or more and 3.0% by mass or less, more preferably 0.2% by mass or more and 1.5% by mass or less, still more preferably 0.3% by mass or more and 0.7% by mass or less relative to the total amount of the binder resin.

Examples of thermoplastic resins include polystyrene resins, polyolefin resins, ABS resins (including heat-resistant ABS resins), AS resins, AN resins, polyphenylene oxide resins, polycarbonate resins, polyacetal resins, acrylic resins, polyethylene terephthalate resins, polybutylene terephthalate resins, polysulfone resins, and polyphenylene sulfide resins. From the viewpoint of transparency, preferred are acrylic resins.

The thermoplastic resin has a weight average molecular weight preferably 20000 or more and 200000 or less, more preferably 30000 or more and 150000 or less, still more preferably 50000 or more and 100000 or less.

Examples of low-refractive index particles include hollow particles and solid particles. The low-refractive index particles may contain any one of hollow particles and solid particles, but preferably contain both of hollow particles and solid particles. When both of hollow particles and solid particles are contained, an appropriate reduction in refractive index of the low-refractive index layer can be facilitated while a reduction in coating strength is suppressed. When a reduction in refractive index of the low-refractive index layer has a precedence, the low-refractive index particles can contain hollow particles without solid particles as one embodiment.

Although a material for hollow particles and that for solid particles may be any one of inorganic compounds such as silica and magnesium fluoride and organic compounds, silica is preferred to reduce the refractive index and obtain strength.

The average primary particle diameter of the hollow particles is preferably smaller than the thickness of the low-refractive index layer, and is 1 nm or more and 150 nm or less, for example. The average primary particle diameter of the hollow particles is preferably 35 nm or more and 100 nm or less, more preferably 50 nm or more and 100 nm or less, still more preferably 60 nm or more and 80 nm or less.

The average primary particle diameter of the solid particles is preferably smaller than the thickness of the low-refractive index layer, and is 0.5 nm or more and 100 nm or less, for example. The average primary particle diameter of the solid particles is preferably 1 nm or more and 30 nm or less, more preferably 5 nm or more and 20 nm or less, still more preferably 10 nm or more and 15 nm or less.

Where the average primary particle diameter of the hollow particles is defined as X and the average primary particle diameter of the solid particles is defined as Y, Y/X is preferably 0.10 or more and 0.30 or less, more preferably 0.13 or more and 0.25 or less, still more preferably 0.15 or more and 0.20 or less. By controlling Y/X within the ranges above, uniform arrangement of the hollow particles and the solid particles can be facilitated, and favorable scratch resistance can be readily obtained.

The average primary particle diameter of the hollow particles, that of solid particles described later, and that of high-refractive index particles described later can be calculated by the steps (A1) to (A3) below.

(A1) A cross-section of an optical film is photographed with an STEM. The accelerating voltage of the STEM is set at 10 kv to 30 kV, and the magnification is set at 50000× to 300000×.

(A2) Any 10 particles are extracted from the image for observation, and the particle diameter of each of the particles is calculated. The cross-section of a particle is sandwiched between two arbitrary parallel straight lines, and the combination of the lines that maximizes the distance between the two straight lines is identified. The distance between the two straight lines identified as described above is defined as the particle diameter of each of the particles.

(A3) The same operation is performed 5 times on an image for observation of the same sample on another screen, and the number average of 50 particle diameters in total is defined as the average primary particle diameter of the particles.

A larger content of the hollow particles leads to an increase in filling rate of the hollow particles in the binder resin and a reduction in refractive index of the low-refractive index layer. For this reason, the content of the hollow particles is preferably 100 parts by mass or more, more preferably 150 parts by mass or more relative to 100 parts by mass of the binder resin.

On the other hand, when the content of the hollow particles is excessively large, the hollow particles are likely to be damaged or drop off, and the mechanical strength of the low-refractive index layer such as scratch resistance tends to be reduced. For this reason, the content of the hollow particles is preferably 300 parts by mass or less, more preferably 250 parts by mass or less relative to 100 parts by mass of the binder resin.

To obtain favorable scratch resistance of the low-refractive index layer, the content of the solid particles is preferably 20 parts by mass or more, more preferably 40 parts by mass or more relative to 100 parts by mass of the binder resin.

On the other hand, when the content of the solid particles is excessively large, solid particles are likely to aggregate. For this reason, the content of the solid particles is preferably 100 parts by mass or less, more preferably 60 parts by mass or less relative to 100 parts by mass of the binder resin.

Where the content of the hollow particles relative to 100 parts by mass of the binder resin is defined as A and the content of the solid particles relative to 100 parts by mass of the binder resin is defined as B, B/A is preferably 0.15 or more and 0.40 or less, more preferably 0.17 or more and 0.35 or less, still more preferably 0.20 or more and 0.30 or less. By controlling B/A within the ranges above, uniform arrangement of the hollow particles and the solid particles can be facilitated, and favorable scratch resistance can be readily obtained.

The high-refractive index layer is preferably disposed closer to the anti-glare layer than the low-refractive index layer.

The lower limit of the refractive index of the high-refractive index layer is preferably 1.53 or more, more preferably 1.54 or more, still more preferably 1.55 or more, further still more preferably 1.56 or more, and the upper limit is preferably 1.85 or less, more preferably 1.80 or less, still more preferably 1.75 or less, further still more preferably 1.70 or less.

The upper limit of the thickness of the high-refractive index layer is preferably 200 nm or less, more preferably 180 nm or less, still more preferably 150 nm or less, and the lower limit is preferably 50 nm or more, more preferably 70 nm or more.

Examples of binder resins for the high-refractive index layer include the same binder resins as those for the low-refractive index layer.

Examples of the high-refractive index particles include antimony pentoxide, zinc oxide, titanium oxide, cerium oxide, tin-doped indium oxide, antimony-doped tin oxide, yttrium oxide, and zirconium oxide.

The average primary particle diameter of the high-refractive index particles is preferably 2 nm or more, more preferably 5 nm or more, still more preferably 10 nm or more. From the viewpoint of suppression of whitening and transparency, the average primary particle diameter of the high-refractive index particles is preferably 200 nm or less, more preferably 100 nm or less, still more preferably 80 nm or less, further still more preferably 60 nm or less, further still more preferably 30 nm or less.

It is sufficient that the content of the high-refractive index particles is a content providing the above-mentioned range of the refractive index of the high-refractive index layer.

When the anti-reflection layer such as the low-refractive index layer and the high-refractive index layer is formed by the wet process, preferably, the viscosity of the coating solution for the anti-reflection layer is increased. By increasing the viscosity of the coating solution for the anti-reflection layer, the coating solution for the anti-reflection layer is difficult to flow down between projections of the anti-glare layer. Thus, the surface profile of the anti-glare layer can be readily maintained even if the anti-reflection layer is formed on the anti-glare layer. Thus, an appropriately increased viscosity of the coating solution for an anti-reflection layer can facilitate control of the Vmp and the Sal within the ranges specified above. The viscosity of the coating solution for the anti-reflection layer can be increased, for example, by adding a thermoplastic resin as a binder resin, by increasing the proportion of the oligomer as the ionizing radiation curable-resin composition, or by selecting a solvent having high viscosity as the solvent.

On the other hand, if the viscosity of the coating solution for an anti-reflection layer is excessively increased, defects may occur to the surface of the anti-glare layer during application of the coating solution for an anti-reflection layer in some cases.

For this reason, the viscosity at 23° C. of the coating solution for the anti-reflection layer is preferably 0.1 mPa·s or more and 5.0 mPa·s or less.

Examples of the solvent for the coating solution for an anti-reflection layer include the same solvents as those listed above in the coating solution for an anti-glare layer.

When the anti-glare layer is formed from the anti-reflection layer coating solution, the drying conditions are preferably controlled.

The drying conditions can be controlled by the drying temperature and the air rate inside the dryer. The drying temperature is preferably 30° C. or more and 70° C. or less, and the air rate for drying is preferably 10 m/s or more and 30 m/s or less. By setting the drying temperature at a low temperature, the viscosity of the coating solution for the anti-reflection layer can be readily increased. By increasing the air rate, the viscosity of the coating solution for the anti-reflection layer can be increased quickly. Thus, the surface profile of the anti-glare layer can be readily maintained by drying the coating solution for an anti-reflection layer at a relatively low temperature and a high air rate. In other words, control of the Vmp and the Sal can be facilitated by drying the coating solution for an anti-reflection layer at a relatively low temperature and a high air rate.

The irradiation with the ionizing radiation is suitably performed after the coating solution for the anti-reflection layer is dried.

—Case of Multilayer Structure Such as Three or More Layered Structure—

The multilayer structure preferably formed by the dry process has a laminate configuration of three or more layers in total in which the high-refractive index layer and the low-refractive index layer are alternately disposed. Even in the multilayer structure, the low-refractive index layer is preferably disposed on the outermost surface of the optical film.

The high-refractive index layer has a thickness of preferably 10 nm or more and 200 nm or less, and has a refractive index of preferably 2.10 or more and 2.40 or less. The high-refractive index layer more preferably has a thickness of 20 nm or more and 70 nm or less.

The low-refractive index layer has a thickness of preferably 5 nm or more and 200 nm or less, and a refractive index of preferably 1.33 or more and 1.53 or less. The low-refractive index layer more preferably has a thickness of 20 nm or more and 120 nm or less.

<Optical Properties>

The total light transmittance of the optical film specified in JIS K7361-1:1997 is preferably 80% or more, more preferably 85% or more, still more preferably 90% or more.

The light incident surface in measurement of the total light transmittance and the haze is the surface opposite to the surface to depressions and projections.

In the optical film, preferably, the haze specified in JIS K7136:2000 is 20% or more and 75% or less. The lower limit of the haze is more preferably 30% or more, still more preferably 40% or more, further still more preferably 50% or more, and the upper limit is more preferably 70% or less, still more preferably 65% or less.

By controlling the haze to 20% or more, favorable anti-glare properties can be readily obtained. By controlling the haze to 75% or less, a reduction in resolution of images can be readily suppressed.

In an embodiment, the haze of the optical film falls within the ranges of 20% or more and 75% or less, 20% or more and 70% or less, 20% or more and 65% or less, 30% or more and 75% or less, 30% or more and 70% or less, 30% or more and 65% or less, 40% or more and 75% or less, 40% or more and 70% or less, 40% or more and 65% or less, 50% or more and 75% or less, 50% or more and 70% or less, and 50% or more and 65% or less.

To obtain a high resolution of images and favorable contrast, the optical film has an internal haze of preferably 20% or less, more preferably 15% or less, still more preferably 10% or less.

The internal haze can be measured by a general method, for example, by burying the depressions and projections of the surface with depressions and projections by bonding a transparent sheet to the surface with depressions and projections via a transparent adhesive layer. The difference between the refractive index of the adhesive of the transparent adhesive layer and that of the binder resin is 0.05 or less.

For the transmissive image clarity of the optical film measured according to JIS K7374:2007, where the transmissive image clarity when the width of the optical comb is 0.125 mm is defined as $C_{0.125}$, that when the width of the optical comb is 0.25 mm is defined as $C_{0.25}$, that when the width of the optical comb is 0.5 mm is defined as $C_{0.5}$, that when the width of the optical comb is 1.0 mm is defined as $C_{1.0}$, and that when the width of the optical comb is 2.0 mm is defined as $C_{2.0}$, the values of $C_{0.125}$, $C_{0.25}$, $C_{0.5}$, $C_{1.0}$, and $C_{2.0}$ preferably fall within the ranges below.

To obtain favorable anti-glare properties, $C_{0.125}$ is preferably 50% or less, more preferably 40% or less, still more preferably 30% or less, further still more preferably 20% or less. To obtain a high resolution, $C_{0.125}$ is preferably 1.0% or more. The range of $C_{0.125}$ is, for example, 1.0% or more and 50% or less, 1.0% or more and 40% or less, 1.0% or more and 30% or less, or 1.0% or more and 20% or less.

To obtain favorable anti-glare properties, $C_{0.25}$ is preferably 50% or less, more preferably 40% or less, still more preferably 30% or less, further still more preferably 20% or less. To obtain a high resolution, $C_{0.25}$ is preferably 1.0% or more. The range of $C_{0.25}$ is, for example, 1.0% or more and 50% or less, 1.0% or more and 40% or less, 1.0% or more and 30% or less, or 1.0% or more and 20% or less.

To obtain favorable anti-glare properties, $C_{0.5}$ is preferably 50% or less, more preferably 40% or less, still more preferably 30% or less, further still more preferably 20% or less. To obtain a high resolution, $C_{0.5}$ is preferably 1.0% or more. The range of $C_{0.5}$ is, for example, 1.0% or more and 50% or less, 1.0% or more and 40% or less, 1.0% or more and 30% or less, or 1.0% or more and 20% or less.

To obtain favorable anti-glare properties, $C_{1.0}$ is preferably 50% or less, more preferably 40% or less, still more preferably 30% or less, further still more preferably 20% or less. To obtain a high resolution, $C_{1.0}$ is preferably 1.0% or more. The range of $C_{1.0}$ is, for example, 1.0% or more and 50% or less, 1.0% or more and 40% or less, 1.0% or more and 30% or less, or 1.0% or more and 20% or less.

To obtain favorable anti-glare properties, $C_{2.0}$ is preferably 50% or less, more preferably 40% or less, still more preferably 30% or less, further still more preferably 20% or less. To obtain a high resolution, $C_{2.0}$ is preferably 5.0% or more. The range of $C_{2.0}$ is, for example, 5.0% or more and 50% or less, 5.0% or more and 40% or less, 5.0% or more and 30% or less, or 5.0% or more and 20% or less.

To obtain favorable anti-glare properties, in the optical film, the total of $C_{0.125}$, $C_{0.5}$, $C_{1.0}$, and $C_{2.0}$ is preferably 200% or less, more preferably 150% or less, still more preferably 100% or less, further still more preferably 80% or less. To obtain a high resolution, the total is preferably 10.0% or more. The range of the total is, for example, 10.0% or more and 200% or less, 10.0% or more and 150% or less, 10.0% or more and 100% or less, or 10.0% or more and 80% or less.

<Size, Shape, and the Like>

The optical film may be in a sheet-like form cut into a predetermined size, or may be in a roll-like form of an elongated sheet wound into a roll. Although the sheet can have any size, the maximum diameter is about 2 inches or more and 500 inches or less. The "maximum diameter" indicates the maximum length between any two points in the optical film when they are connected. For example, when the optical film is in a rectangular shape, the diagonal line of the region corresponds to the maximum diameter. When the optical film is in a circular shape, the diameter of the circle corresponds to the maximum diameter.

Although the width and length of the roll-like form are not particularly limited, usually, the width is about 500 mm or more and 3000 mm or less, and the length is about 500 m or more and 5000 m or less. The optical film in the roll-like form, when used, can be cut into sheets according to the size of the image display device. When the optical film is cut, preferably, roll ends having unstable physical properties are removed.

The sheet can have any shape, and examples of the shape include polygonal shapes such as triangular, rectangular, and pentagonal shapes, circular shapes, and random amorphous shapes. More specifically, when the optical film is in a rectangular shape, the optical film can have any aspect ratio as long as it causes no problems as the display screen. Examples of the aspect ratio include width:length=1:1, 4:3, 16:10, 16:9, or 2:1, but not limited thereto in applications to in-vehicle display screens and digital signages having a variety of design.

The surface profile of the optical film on the side opposite to the surface with depressions and projections is not particularly limited. Preferably, the surface profile thereof is substantially smooth. The term "substantially smooth" indicates that the arithmetic mean roughness Ra at a cutoff value of 0.8 mm specified in JIS B0601:1994 is less than 0.03 μm, and preferably the arithmetic mean roughness is 0.02 μm or less.

The optical film according to the present disclosure can be suitably used as an optical member on the light-emitting surface side of the display element, and can be suitably used particularly as an optical member disposed on the topmost surface of an image display panel or an image display device.

[Image Display Panel]

The image display panel according to the present disclosure comprises a display element and the above-mentioned optical film according to the present disclosure, wherein the optical film is disposed on the display element such that a surface with depressions and projections thereof faces the side opposite to the display element, and the optical film is disposed on the topmost surface (see FIG. 2).

Examples of the display element include liquid crystal display elements, EL display elements (organic EL display elements, inorganic EL display elements), and plasma display elements. Furthermore, examples thereof include LED display elements such as micro LED display elements. These display elements may have a touch panel function inside thereof.

Examples of liquid crystal display methods for liquid crystal display elements include an IPS method, a VA method, a multi-domain method, an OCB method, an STN method, and a TSTN method. When the display element is a liquid crystal display element, backlight is needed. The backlight is disposed on the side opposite to the side of the liquid crystal display element on which the optical film is disposed.

The image display panel according to the present disclosure may be an image display panel with a touch panel, comprising a touch panel between the display element and the optical film. In this case, the optical film can be disposed on the topmost surface of the image display panel with a touch panel while the side of the optical film including the surface with depressions and projections faces the side opposite to the display element.

Although the image display panel can have any size, the maximum diameter is about 2 inches or more and 500 inches or less. The maximum diameter indicates the maximum length between any two points in a plane of the image display panel when they are connected.

[Image Display Device]

The image display device according to the present disclosure comprises the above-mentioned image display panel according to the present disclosure.

Within the image display device, the optical film is disposed on the topmost surface of the image display device.

Preferably, the image display device according to the present disclosure further comprises a drive controller electrically connected to the image display panel, and a housing which accommodates the image display panel and the drive controller.

When the display element is a liquid crystal display element, the image display device according to the present disclosure needs a backlight. The backlight is disposed on the side opposite to the light-emitting surface side of the liquid crystal display element.

Although the image display device can have any size, the maximum diameter of the effective display region is about 2 inches or more and 500 inches or less.

The effective display region of the image display device is a region which can display an image. For example, when the image display device comprises a housing surrounding the display element, the region inside the housing corresponds to the effective image region.

The maximum diameter of the effective image region indicates the maximum length between any two points inside the effective image region when they are connected. For example, when the effective image region is in a rectangular shape, the diagonal line of the region corresponds to the maximum diameter. When the effective image region is in a circular shape, the diameter of the region corresponds to the maximum diameter.

The present disclosure includes (1) to (14) below.

(1) An optical film having a surface with depressions and projections,
wherein the surface with depressions and projections has
a peak material volume Vmp of 0.010 ml/m² or more and 0.050 ml/m² or less specified in ISO 25178-2:2012, and a minimum autocorrelation length Sal of 4.0 μm or more and 12.0 μm or less specified in ISO 25178-2: 2012.

(2) The optical film according to (1), wherein the surface with depressions and projections has a core void volume Vvc of 0.30 ml/m² or more and 1.00 ml/m² or less specified in ISO 25178-2:2012.

(3) The optical film according to (1) or (2), wherein the surface with depressions and projections has a peak extreme height Sxp of 0.55 μm or more and 2.00 μm or less specified in ISO 25178-2:2012.

(4) The optical film according to any one of (1) to (3), wherein the surface with depressions and projections has an arithmetic mean height Sa of 0.20 μm or more and 1.00 μm or less specified in ISO 25178-2:2012.

(5) The optical film according to any one of (1) to (4), comprising a functional layer on a substrate, wherein the surface of the functional layer is the surface with depressions and projections.

(6) The optical film according to (5), comprising an anti-glare layer as the functional layer, wherein the surface of the anti-glare layer is the surface with depressions and projections.

(7) The optical film according to (5), comprising an anti-glare layer and an anti-reflection layer as the functional layer, wherein the surface of the anti-reflection layer is the surface with depressions and projections.

(8) The optical film according to (6) or (7), wherein the anti-glare layer contains a binder resin and particles.

(9) The optical film according to (8), wherein the particles contain amorphous inorganic particles.

(10) The optical film according to (9), wherein the particles further contain organic particles.

(11) The optical film according to any one of (8) to (10), wherein the binder resin contains a cured product of an ionizing radiation curable-resin composition.

(12) The optical film according to any one of (1) to (11), having a haze specified in JIS K7136: 2000 of 20% or more and 75% or less.

(13) An image display panel comprising a display element and the optical film according to any one of (1) to (12), wherein the optical film is disposed on the display element such that the surface with depressions and projections of the optical film faces the side opposite to the display element, and the optical film is disposed on the topmost surface.

(14) An image display device comprising the image display panel according to (13).

EXAMPLES

Next, the present disclosure will be described in more detail by way of Examples, but these examples should not be construed as limitations to the present disclosure. The terms "parts" and "%" are mass-based unless otherwise specified.

1. Measurements and Evaluations

As described below, optical films in Examples and Comparative Examples were measured and evaluated. The atmosphere in the measurements and evaluations was set at a temperature of 23±5° C. and a relative humidity of 40% or more and 65% or less. Before each measurement and evaluation were started, the target samples were exposed to the atmosphere for 30 minutes or more and 60 minutes or less, followed by the measurement and the evaluation. The results are shown in Table 1 or 2.

1-1. Measurement of Surface Profile

Anti-glare films in Examples and Comparative Examples were cut into a size of 10 cm×10 cm. The anti-glare films were visually checked, and their cut portions were selected at random from portions without abnormalities such as dirt or scratches. The substrate side of each cut anti-glare film was bonded to a glass plate (thickness: 2.0 mm) having a length of 10 cm×a width of 10 cm with an optical transparent adhesive sheet (trade name: PANACLEAN PD-S1, thickness: 25 µm) available from PANAC CO., LTD. to prepare a sample 1.

Using a confocal laser microscope (VK-X250 (controller) and VK-X260 (measurement section)), the sample 1 was set on the measurement stage to be fixed and tightly adhere to the stage, and thereafter the surface profile of the anti-glare film was measured and analyzed on the measurement conditions 1, image processing conditions 1, and analysis conditions 1 below. Multi-file analysis application (version 1.3.1.120) was used as measurement and analysis software. The surface profile was measured under an environment without vibration (the surface profile may be measured under an environment where vibration is suppressed using an anti-vibration table).

(Measurement Conditions 1)
Laser wavelength: 408 nm
Optical system for measurement: confocal optical system
Object lens: 150×
Zoom: 1×
Region for measurement: 93.95 µm×70.44 µm
The number of measurement points: 1024×768 points
Measurement conditions: surface profile of a transparent object/high precision/with double scan (Image Processing Conditions 1)
DCL/BCL: DCL=13000, BCL=65535, processing method: complement from surrounding pixels
Height cut level: strong (Analysis Conditions 1)
Region: the entire region
Filter type: Gaussian
S-filter: 0.25 µm
F-operation: plane tilt correction (region specified)
L-filter: none
End effect correction: ON
p, q during calculation of Sxp: p=2.5%, q=50.0%
s during calculation of Sal: s=0.20

Using the analysis software, "Vmp", "Sal", "Vvc", "Sxp", and "Sa" in each measured region were displayed, and were defined as measured values.

1-2. Haze (Hz)

Optical films in Examples and Comparative Examples each were cut into a 10 cm square. The optical films were visually checked, and their cut portions were selected at random from portions without abnormalities such as dirt or scratches. Using a haze meter (HM-150, available from MURAKAMI COLOR RESEARCH LABORATORY), the samples were measured for haze specified in JIS K7136: 2000.

To stabilize the light source, the apparatus was on standby for 15 minutes or longer since the power supply switch was turned on. Calibration was performed without setting anything in the inlet opening. Subsequently, the sample to be measured was set in the inlet opening, and was measured. The light incident surface was the substrate side.

The optical films in Examples and Comparative Examples all had a total light transmittance of 90% or more.

1-3. Transmissive Image Clarity

Optical films in Examples and Comparative Examples each were cut into a 10 cm square. The optical films were visually checked, and their cut portions were selected at random from portions without abnormalities such as dirt or scratches. Using an image clarity meter (trade name: ICM-1T) available from Suga Test Instruments Co., Ltd., the samples were measured for transmissive image clarity according to JIS K7374:2007. Optical combs having five widths in total, i.e., 0.125 mm, 0.25 mm, 0.5 mm, 1.0 mm, and 2.0 mm were used. In the measurement, the light incident surface was the transparent substrate side. The values of $C_{0.125}$, $C_{0.25}$, $C_{0.5}$, $C_{1.0}$, and $C_{2.0}$ and the total value of $C_{0.125}$, $C_{0.5}$, $C_{1.0}$, and $C_{2.0}$ are shown in Table 2.

1-4. Anti-Glare Properties

Optical films in Examples and Comparative Examples were cut into a size of 10 cm×10 cm. The optical films were visually checked, and their cut portions were selected at random from portions without abnormalities such as dirt or scratches. The substrate side of each cut anti-glare film was bonded to a black plate (Kuraray Co., Ltd., trade name: COMOGLAS DFA2CG 502K (black) series, thickness: 2 mm) having a size of a length of 10 cm×a width of 10 cm with an optical transparent pressure-sensitive adhesive sheet available from PANAC CO., LTD. (trade name: PANACLEAN PD-S1) to prepare a sample 2.

Under an environment of a bright room, the samples 2 were each placed on a horizontal stand at a height of 70 cm such that the surface with depressions and projections faced upward. At this time, the sample was arranged to be located substantially immediately under the illumination light. The sample was observed from the front (such that the observer did not block the illumination light), and reflection of the illumination light on the surface with depressions and projections was evaluated according to the criteria for evaluation below.

The illumination used was an Hf32 straight tube three-wavelength day white fluorescent lamp, and was located at a height of 2 m above from the horizontal stand in the vertical direction. The samples were evaluated in the region thereof where the illuminance on the surface with depressions and projections was within the range of 500 lux or more and 1000 lux or less. The eye line of the observer was set at around 120 cm from the floor. The observers were healthy people in 30's having a vision of 0.7 or higher.

<Criteria for Evaluation>
  A: No outline of the illumination is observed, and its position is not sensed
  B: The outline of the illumination is not observed, but its position is vaguely sensed
  C: The outline and the position of the illumination are vaguely sensed
  D: The outline of the illumination is observed less vaguely, and its position is clearly sensed 1-5. Jet-Black Appearance Samples used were the samples 2 prepared in 1-4. The samples were observed in the same manner as in 1-4 except that the eye line of the observer was changed to around 160 cm from the floor.

Based on the evaluation points below, 20 subjects evaluated the samples. 20 subjects were constituted with age groups from 20's to 50's, each age group containing 5 subjects. The average point of the evaluations by the 20 subjects was calculated, and the sample was ranked according to the criteria below.

<Evaluation Points>
  (1) It looks sufficiently black without any whiteness: 3 points
  (2) It looks black but whiteness is slightly sensed: 2 points
  (3) Whiteness is remarkably sensed: 1 point <Criteria for Evaluation>
  A: The average is 2.5 or more.
  B: The average is 2.0 or more and less than 2.5.
  C: The average is 1.5 or more and less than 2.0.
  D: The average is less than 1.5.

1-6. Scratch Resistance

Samples used were the samples 2 prepared in 1-4. Each sample 2 was bonded to a measurement stage of a color fastness rubbing tester (available from TESTER SANGYO CO. LTD., trade name "AB-301") while the surface with depressions and projections was disposed as the top surface. A steel wool #0000 (available from Nippon Steel Wool Co., Ltd., trade name "Bonstar B-204") was set. The steel wool was brought into contact with the surface with depressions and projections, and was moved with 10 reciprocations under a load at a moving rate of 100 mm/sec and a moving distance of 200 mm per one reciprocation. The contact area between the steel wool and the sample was 1 $cm^2$.

Subsequently, the samples were visually observed under light from a fluorescent lamp, and the number of scratches was verified. At this time, the illuminance above the sample was 800 lux or more and 1200 lux or less, and the distance for observation was 30 cm.

For the samples, the maximum load ($g/cm^2$) per unit area when no scratch was observed after the test was verified. For each of the samples, the test was performed where n=2, and the average of the maximum loads was calculated, and evaluation was performed according to the following criteria.

<Criteria for Evaluation>
A: The maximum load is 300 $g/cm^2$ or more.
B: The maximum load is 200 $g/cm^2$ or more and less than 300 $g/cm^2$.
C: The maximum load is less than 200 $g/cm^2$.

1-7. Comprehensive Evaluation

Comprehensive evaluation was performed based on the three evaluations of anti-glare properties, jet-black appearance, and scratch resistance according to the following criteria.

<Criteria for Evaluation>
A: Among the three evaluations, all are A.
B: Among the three evaluations, two are A, and one is B.
C: Among the three evaluations, all are B. Alternatively, among the three evaluations, two are B, and one is A.
D: Among the three evaluations, one or more is C or D.

2. Preparation of Optical Film

Example 1

An anti-glare layer coating solution 1 described below was applied onto a substrate (triacetyl cellulose resin film having a thickness of 80 µm, FUJIFILM Corporation, TD80UL). In the next step, the applied coating solution was dried at 50° C. and an air rate of 5 m/s for 30 seconds, and was further dried at 70° C. and an air rate of 10 m/s for 45 seconds. The resulting coating was then irradiated with ultraviolet light under a nitrogen atmosphere having an oxygen concentration of 200 ppm or less with an accumulated light amount of 50 mJ/$cm^2$, thereby forming an anti-glare layer having a thickness of 5.8 µm.

A low-refractive index layer coating solution described below was then applied onto the anti-glare layer. In the next step, the applied coating solution was dried at 50° C. and an air rate of 20 m/s for 30 seconds. The resulting coating was then irradiated with ultraviolet light under a nitrogen atmosphere having an oxygen concentration of 200 ppm or less with an accumulated light amount of 150 mJ/$cm^2$, thereby forming a low-refractive index layer having a thickness of 0.10 µm. Thus, an optical film in Example 1 was prepared. The refractive index of the low-refractive index layer was 1.31.

The anti-glare layers in Examples 1 to 8 and Comparative Examples 1 to 4 were prepared by the method (d1) in the specification.

<Anti-Glare Layer Coating Solution 1>
urethane acrylate A 35 parts
(Mitsubishi Chemical Corporation, trade name: U-1700B, molecular weight: 2,000, the number of functional groups: 10)
urethane acrylate B 15 parts
(Shin Nakamura Chemical Co., Ltd., trade name: U-15HA, molecular weight: 2,300, the number of functional groups: 15)
pentaerythritol triacrylate 50 parts
(TOAGOSEI CO., LTD., trade name: M-305)
silica particles 25 parts
(surface treated amorphous silica, d10: 2.3 µm, d50: 5.1 µm, d90: 7.4 µm)
organic particles A 9 parts
(spherical polyacrylic-styrene copolymer, average particle size: 1.5 µm (proportion of particles having a particle diameter of 1.3 to 1.7 µm was 90% or more), refractive index: 1.515)
photopolymerization initiator 4.0 parts
(IGM Resins B.V., trade name: Omnirad 184)
photopolymerization initiator 0.6 part
(IGM Resins B.V., trade name: Omnirad 907)
silicone leveling agent 0.1 parts
(Momentive Performance Materials Inc., trade name: TSF4460)
solvent (toluene) 180.4 parts
solvent (cyclohexanone) 4.0 parts
solvent (methyl isobutyl ketone) 49.4 parts <Low-Refractive Index Layer Coating Solution>
polyfunctional acrylate ester composition 100 parts
(available from Dai-ichi Kogyo Seiyaku Co., Ltd., trade name "NEW FRONTIER MF-001")
acrylic polymer 0.5 parts
(weight average molecular weight: 55,000)
hollow silica particles 200 parts
(average primary particle diameter: 75 nm, particles surface-treated with a silane coupling agent having a methacryloyl group)
solid silica particles 50 parts
(average primary particle diameter: 12.5 nm, particles surface treated with a silane coupling agent having a methacryloyl group)
silicone-based leveling agent 15 parts
(Shin-Etsu Chemical Co., Ltd., trade name "X-22-164E")
photopolymerization initiator 4.3 parts
(IGM Resins, trade name "Omnirad 127")
solvent 14,867 parts
(mixed solvent of methyl isobutyl ketone and 1-methoxy-2-propyl acetate. mass ratio=72/28)

Examples 2 to 8

Optical films in Examples 2 to 8 were prepared in the same manner as in Example 1 except that the anti-glare layer coating solution 1 was replaced by anti-glare layer coating solutions 2 to 8 described below.

Example 9

An anti-glare layer coating solution 9 having a composition described below was applied onto a transparent substrate (triacetylcellulose resin film (TAC) having a thickness of 80 µm, FUJIFILM Corporation, TD80UL), and was dried at 70° C. and an air rate of 1 m/s for 60 seconds. Thereafter, the coating was irradiated with an accumulated light amount of 60 mJ/cm² to form an anti-glare layer. The thickness of the anti-glare layer was 8.5 µm. In the next step, a low-refractive index layer was formed on the anti-glare layer in the same manner as in Example 1 to prepare an optical film in Example 9.

Comparative Example 1

An optical film in Comparative Example 1 was prepared in the same manner as in Example 1 except that the anti-glare layer coating solution 1 was replaced by an anti-glare layer coating solution 10 described below and the thickness of the anti-glare layer was changed to 4.5 µm.

Comparative Example 2

An optical film in Comparative Example 2 was prepared in the same manner as in Example 1 except that the anti-glare layer coating solution 1 was replaced by an anti-glare layer coating solution 11 described below and the thickness of the anti-glare layer was changed to 4.4 µm.

Comparative Examples 3 to 4

Optical films in Comparative Examples 3 to 4 were prepared in the same manner as in Example 1 except that the anti-glare layer coating solution 1 was replaced by anti-glare layer coating solutions 12 to 13 described below.

<Anti-Glare Layer Coating Solution 2>
urethane acrylate A 35 parts
(Mitsubishi Chemical Corporation, trade name: U-1700B, molecular weight: 2,000, the number of functional groups: 10)
urethane acrylate B 15 parts
(Shin Nakamura Chemical Co., Ltd., trade name: U-15HA, molecular weight: 2,300, the number of functional groups: 15)
pentaerythritol triacrylate 50 parts
(TOAGOSEI CO., LTD., trade name: M-305)
silica particles 23 parts
(surface-treated amorphous silica, d10: 2.3 µm, d50: 5.1 µm, d90: 7.4 µm)
organic particles A 5.8 parts
(spherical polyacrylic-styrene copolymer, average particle size: 1.5 µm (proportion of particles having a particle diameter of 1.3 to 1.7 µm was 90% or more), refractive index: 1.515)
organic particles B 4.3 parts
(spherical polyacrylic-styrene copolymer, average particle size: 1.5 µm (proportion of particles having a particle diameter of 1.3 to 1.7 µm was 90% or more), refractive index: 1.590)
photopolymerization initiator 4.1 parts
(TGM Resins B.V., trade name: Omnirad 184)
photopolymerization initiator 0.7 parts
(IGM Resins B.V., trade name: Omnirad 907)
silicone leveling agent 0.1 parts
(Momentive Performance Materials Inc., trade name: TSF4460)
solvent (toluene) 216.0 parts
solvent (cyclohexanone) 1.5 parts
solvent (methyl isobutyl ketone) 18.9 parts <Anti-Glare Layer Coating Solution 3>
urethane acrylate A 35 parts
(Mitsubishi Chemical Corporation, trade name: U-1700B, molecular weight: 2,000, the number of functional groups: 10)
urethane acrylate B 15 parts
(Shin Nakamura Chemical Co., Ltd., trade name: U-15HA, molecular weight: 2,300, the number of functional groups: 15)
pentaerythritol triacrylate 50 parts
(TOAGOSEI CO., LTD., trade name: M-305)
silica particles 23 parts
(surface treated amorphous silica, d10: 2.3 µm, d50: 5.1 µm, d90: 7.4 µm)
organic particles A 4.1 parts
(spherical polyacrylic-styrene copolymer, average particle size: 1.5 µm (proportion of particles having a particle diameter of 1.3 to 1.7 µm was 90% or more), refractive index: 1.515)
organic particles B 5.9 parts
(spherical polyacrylic-styrene copolymer, average particle size: 1.5 µm (proportion of particles having a particle diameter of 1.3 to 1.7 µm was 90% or more), refractive index: 1.590)
photopolymerization initiator 4.1 parts
(IGM Resins B.V., trade name: Omnirad 184)
photopolymerization initiator 0.7 parts
(IGM Resins B.V., trade name: Omnirad 907)
silicone leveling agent 0.1 parts
(Momentive Performance Materials Inc., trade name: TSF4460)
solvent (toluene) 201.2 parts
solvent (cyclohexanone) 2.3 parts
solvent (methyl isobutyl ketone) 22.5 parts <Anti-Glare Layer Coating Solution 4>
urethane acrylate A 35 parts
(Mitsubishi Chemical Corporation, trade name: U-1700B, molecular weight: 2,000, the number of functional groups: 10)
urethane acrylate B 15 parts
(Shin Nakamura Chemical Co., Ltd., trade name: U-15HA, molecular weight: 2,300, the number of functional groups: 15)
pentaerythritol triacrylate 50 parts
(TOAGOSEI CO., LTD., trade name: M-305)
silica particles 21 parts
(surface treated amorphous silica, d10: 2.3 µm, d50: 5.1 µm, d90: 7.4 µm)
organic particles A 4.1 parts
(spherical polyacrylic-styrene copolymer, average particle size: 1.5 µm (proportion of particles having a particle diameter of 1.3 to 1.7 µm was 90% or more), refractive index: 1.515)
organic particles B 5.9 parts
(spherical polyacrylic-styrene copolymer, average particle size: 1.5 µm (proportion of particles having a particle diameter of 1.3 to 1.7 µm was 90% or more), refractive index: 1.590)
photopolymerization initiator 3.8 parts
(IGM Resins B.V., trade name: Omnirad 184)
photopolymerization initiator 0.7 parts
(IGM Resins B.V., trade name: Omnirad 907)
silicone-based leveling agent 0.2 parts
(Momentive Performance Materials Inc., trade name: TSF4460)
solvent (toluene) 182.2 parts
solvent (cyclohexanone) 1.5 parts
solvent (methyl isobutyl ketone) 37.5 parts <Anti-Glare Layer Coating Solution 5>
 urethane acrylate A 35 parts
  (Mitsubishi Chemical Corporation, trade name: U-1700B, molecular weight: 2,000, the number of functional groups: 10)
 urethane acrylate B 15 parts
  (Shin Nakamura Chemical Co., Ltd., trade name: U-15HA, molecular weight: 2,300, the number of functional groups: 15)
 pentaerythritol triacrylate 50 parts
  (TOAGOSEI CO., LTD., trade name: M-305)
 silica particles 19 parts
  (surface treated amorphous silica, d10: 2.3 μm, d50: 5.1 μm, d90: 7.4 μm)
 organic particles B 12 parts
  (spherical polyacrylic-styrene copolymer, average particle size: 1.5 μm (proportion of particles having a particle diameter of 1.3 to 1.7 μm was 90% or more), refractive index: 1.590)
 photopolymerization initiator 3.7 parts
  (IGM Resins B.V., trade name: Omnirad 184)
 photopolymerization initiator 0.6 parts
  (IGM Resins B.V., trade name: Omnirad 907)
 silicone leveling agent 0.2 parts
  (Momentive Performance Materials Inc., trade name: TSF4460)
 solvent (toluene) 216.7 parts
 solvent (cyclohexanone) 2.5 parts
 solvent (methyl isobutyl ketone) 32.7 parts <Anti-Glare Layer Coating Solution 6>
 urethane acrylate A 35 parts
  (Mitsubishi Chemical Corporation, trade name: U-1700B, molecular weight: 2,000, the number of functional groups: 10)
 urethane acrylate B 15 parts
  (Shin Nakamura Chemical Co., Ltd., trade name: U-15HA, molecular weight: 2,300, the number of functional groups: 15)
 pentaerythritol triacrylate 50 parts
  (TOAGOSEI CO., LTD., trade name: M-305)
 silica particles 19 parts
  (surface-treated amorphous silica, d10: 2.3 μm, d50: 5.1 μm, d90: 7.4 μm)
 organic particles A 11 parts
  (spherical polyacrylic-styrene copolymer, average particle size: 1.5 μm (proportion of particles having a particle diameter of 1.3 to 1.7 μm was 90% or more), refractive index: 1.515)
 organic particles B 1 part
  (spherical polyacrylic-styrene copolymer, average particle size: 1.5 μm (proportion of particles having a particle diameter of 1.3 to 1.7 μm was 90% or more), refractive index: 1.590)
 photopolymerization initiator 3.7 parts
  (IGM Resins B.V., trade name: Omnirad 184)
 photopolymerization initiator 0.6 parts
  (IGM Resins B.V., trade name: Omnirad 907)
 silicone leveling agent 0.2 parts
  (Momentive Performance Materials Inc., trade name: TSF4460)
 solvent (toluene) 175.2 parts
 solvent (cyclohexanone) 4.5 parts
 solvent (methyl isobutyl ketone) 33.5 parts <Anti-Glare Layer Coating Solution 7>
 urethane acrylate A 35 parts
  (Mitsubishi Chemical Corporation, trade name: U-1700B, molecular weight: 2,000, the number of functional groups: 10)
 urethane acrylate B 15 parts
  (Shin Nakamura Chemical Co., Ltd., trade name: U-15HA, molecular weight: 2,300, the number of functional groups: 15)
 pentaerythritol triacrylate 50 parts
  (TOAGOSEI CO., LTD., trade name: M-305)
 silica particles 17 parts
  (surface-treated amorphous silica, d10: 2.3 μm, d50: 5.1 μm, d90: 7.4 μm)
 organic particles A 11 parts
  (spherical polyacrylic-styrene copolymer, average particle size: 1.5 μm (proportion of particles having a particle diameter of 1.3 to 1.7 μm was 90% or more), refractive index: 1.515)
 organic particles B 1 part
  (spherical polyacrylic-styrene copolymer, average particle size: 1.5 μm (proportion of particles having a particle diameter of 1.3 to 1.7 μm was 90% or more), refractive index: 1.590)
 photopolymerization initiator 3.7 parts
  (IGM Resins B.V., trade name: Omnirad 184)
 photopolymerization initiator 0.6 parts
  (IGM Resins B.V., trade name: Omnirad 907)
 silicone-based leveling agent 0.2 parts
  (Momentive Performance Materials Inc., trade name: TSF4460)
 solvent (toluene) 182.1 parts
 solvent (cyclohexanone) 2.8 parts
 solvent (methyl isobutyl ketone) 38.3 parts <Anti-Glare Layer Coating Solution 8>
 urethane acrylate A 35 parts
  (Mitsubishi Chemical Corporation, trade name: U-1700B, molecular weight: 2,000, the number of functional groups: 10)
 urethane acrylate B 15 parts
  (Shin Nakamura Chemical Co., Ltd., trade name: U-15HA, molecular weight: 2,300, the number of functional groups: 15)
 pentaerythritol triacrylate 50 parts
  (TOAGOSEI CO., LTD., trade name: M-305)
 silica particles 17 parts
  (surface treated amorphous silica, d10: 1.4 μm, d50: 3.5 μm, d90: 6.3 μm)
 organic particles A 4.1 parts
  (spherical polyacrylic-styrene copolymer, average particle size: 1.5 μm (proportion of particles having a particle diameter of 1.3 to 1.7 μm was 90% or more), refractive index: 1.515)
 organic particles B 5.9 parts
  (spherical polyacrylic-styrene copolymer, average particle size: 1.5 μm (proportion of particles having a particle diameter of 1.3 to 1.7 μm was 90% or more), refractive index: 1.590)
 photopolymerization initiator 4.2 parts
  (IGM Resins B.V., trade name: Omnirad 184)
 photopolymerization initiator 0.8 parts
  (IGM Resins B.V., trade name: Omnirad 907)
 silicone-based leveling agent 0.2 parts
  (Momentive Performance Materials Inc., trade name: TSF4460)
 solvent (toluene) 203.2 parts
 solvent (cyclohexanone) 1.7 parts
 solvent (methyl isobutyl ketone) 25.8 parts <Anti-Glare Layer Coating Solution 9>
isobornyl methacrylate-containing oligomer 6.0 parts
pentaerythritol triacrylate 20 parts
(TOAGOSEI CO., LTD., trade name: M-305)
dipentaerythritol hexaacrylate 30 parts
(TOAGOSEI CO., LTD., trade name: M-402)
inorganic fine particles dispersion 70 parts
(Nissan Chemical Industries, Ltd., silica having a reactive functional group introduced into the surface thereof, solvent: MIBK, solid content: 35.5%)
photopolymerization initiator 3 parts
(IGM Resins B.V., trade name: Omnirad 184)
photopolymerization initiator 1 part
(IGM Resins B.V., trade name: Omnirad 907)
solvent (isopropanol) 100 parts <Anti-Glare Layer Coating Solution 10>
pentaerythritol triacrylate 100 parts
(TOAGOSEI CO., LTD., trade name: M-305)
silica particles 15 parts
(surface treated amorphous silica, d10: 2.2 μm, d50: 4.0 μm, d90: 6.8 μm)
organic particles C 2 parts
(spherical polyacrylic-styrene copolymer, average particle size: 5.0 μm (proportion of particles having a particle diameter of 4.8 to 5.2 μm was 90% or more), refractive index: 1.515)
photopolymerization initiator 6 parts
(IGM Resins B.V., trade name: Omnirad 184)
photopolymerization initiator 1 part
(TGM Resins B.V., trade name: Omnirad 907)
silicone leveling agent 0.1 parts
(Momentive Performance Materials Inc., trade name: TSF4460)
solvent (toluene) 170 parts
solvent (cyclohexanone) 60 parts <Anti-Glare Layer Coating Solution 11>
pentaerythritol triacrylate 90 parts
(available from NIPPON KAYAKU Co., Ltd., KAYARAD-PET-30)
acrylic polymer 10 parts
(molecular weight: 75,000)
organic particles D 18 parts
(spherical polyacrylic-styrene copolymer, average particle size: 3.5 μm (proportion of particles having a particle diameter of 3.3 to 3.7 μm was 90% or more), refractive index: 1.590)
inorganic ultrafine particles 120 parts
(silica having a reactive functional group introduced into the surface thereof, solvent: MIBK, solid content: 30%)
(average primary particle diameter: 12 nm)
photopolymerization initiator 6 parts
(IGM Resins B.V., trade name: Omnirad 184)
photopolymerization initiator 1 part
(IGM Resins B.V., trade name: Omnirad 907)
silicone leveling agent 0.04 parts
(Momentive Performance Materials Inc., trade name: TSF4460)
solvent (toluene) 150 parts
solvent (cyclohexanone) 75 parts <Anti-Glare Layer Coating Solution 12>
urethane acrylate A 35 parts
(Mitsubishi Chemical Corporation, trade name: U-1700B, molecular weight: 2,000, the number of functional groups: 10)
urethane acrylate B 15 parts
(Shin Nakamura Chemical Co., Ltd., trade name: U-15HA, molecular weight: 2,300, the number of functional groups: 15)
pentaerythritol triacrylate 50 parts
(TOAGOSEI CO., LTD., trade name: M-305)
silica particles 11.9 parts
(surface treated amorphous silica, d10: 1.4 μm, d50: 3.5 μm, d90: 6.3 μm)
organic particles A 4 parts
(spherical polyacrylic-styrene copolymer, average particle size: 1.5 μm (proportion of particles having a particle diameter of 1.3 to 1.7 μm was 90% or more), refractive index: 1.515)
organic particles B 6 parts
(spherical polyacrylic-styrene copolymer, average particle size: 1.5 μm (proportion of particles having a particle diameter of 1.3 to 1.7 μm was 90% or more), refractive index: 1.590)
photopolymerization initiator 3.4 parts
(IGM Resins B.V., trade name: Omnirad 184)
photopolymerization initiator 0.8 part
(IGM Resins B.V., trade name: Omnirad 907)
silicone leveling agent 0.2 parts
(Momentive Performance Materials Inc., trade name: TSF4460)
solvent (toluene) 180.2 parts
solvent (cyclohexanone) 2.5 parts
solvent (methyl isobutyl ketone) 25.3 parts <Anti-Glare Layer Coating Solution 13>
urethane acrylate A 35 parts
(Mitsubishi Chemical Corporation, trade name: U-1700B, molecular weight: 2,000, the number of functional groups: 10)
urethane acrylate B 15 parts
(Shin Nakamura Chemical Co., Ltd., trade name: U-15HA, molecular weight: 2,300, the number of functional groups: 15)
pentaerythritol triacrylate 50 parts
(TOAGOSEI CO., LTD., trade name: M-305)
silica particles 20 parts
(surface-treated amorphous silica, d10: 0.8 μm, d50: 2.8 μm, d90: 4.5 μm)
organic particles A 4 parts
(spherical polyacrylic-styrene copolymer, average particle size: 1.5 μm (proportion of particles having a particle diameter of 1.3 to 1.7 μm was 90% or more), refractive index: 1.515)
organic particles B 10 parts
(spherical polyacrylic-styrene copolymer, average particle size: 1.5 μm (proportion of particles having a particle diameter of 1.3 to 1.7 μm was 90% or more), refractive index: 1.590)
photopolymerization initiator 4.0 parts
(IGM Resins B.V., trade name: Omnirad 184)
photopolymerization initiator 0.8 part
(IGM Resins B.V., trade name: Omnirad 907)
silicone leveling agent 0.2 parts
(Momentive Performance Materials Inc., trade name: TSF4460)
solvent (toluene) 214.6 parts
solvent (cyclohexanone) 1.4 parts
solvent (methyl isobutyl ketone) 18.4 parts In the anti-glare layer coating solutions 1 to 13, urethane acrylates A and B both are an urethane acrylate oligomer.

TABLE 1

| | Vmp [ml/m$^2$] | Sal [μm] | Vvc [ml/m$^2$] | Sxp [μm] | Sa [μm] | Haze [%] | Anti-glare properties | Jet-black appearance | Scratch resistance | Comprehensive evaluation |
|---|---|---|---|---|---|---|---|---|---|---|
| Example 1 | 0.044 | 6.3 | 0.67 | 1.29 | 0.35 | 67.9 | A | A | B | B |
| Example 2 | 0.044 | 6.5 | 0.71 | 1.42 | 0.44 | 63.5 | A | A | B | B |
| Example 3 | 0.034 | 7.2 | 0.65 | 1.19 | 0.36 | 56.4 | A | A | A | A |
| Example 4 | 0.032 | 8.1 | 0.64 | 1.13 | 0.33 | 50.7 | A | A | A | A |
| Example 5 | 0.032 | 9.5 | 0.50 | 0.97 | 0.33 | 44.5 | A | A | A | A |
| Example 6 | 0.032 | 11.6 | 0.60 | 1.04 | 0.29 | 41.6 | A | B | A | B |
| Example 7 | 0.022 | 10.3 | 0.67 | 1.31 | 0.49 | 36.9 | A | B | A | B |
| Example 8 | 0.016 | 7.0 | 0.69 | 0.99 | 0.43 | 55.1 | A | B | A | B |
| Example 9 | 0.014 | 6.6 | 0.67 | 0.96 | 0.45 | 58.1 | A | B | A | B |
| Comparative Example 1 | 0.054 | 9.9 | 0.90 | 1.80 | 0.51 | 42.9 | A | B | C | D |
| Comparative Example 2 | 0.006 | 10.9 | 0.14 | 0.50 | 0.31 | 33.8 | B | D | A | D |
| Comparative Example 3 | 0.028 | 13.6 | 0.60 | 0.87 | 0.36 | 49.2 | A | D | A | D |
| Comparative Example 4 | 0.052 | 3.6 | 0.62 | 1.36 | 0.46 | 72.3 | A | A | C | D |

TABLE 2

| | Transmissive image clarity [%] | | | | | |
|---|---|---|---|---|---|---|
| | $C_{0.125}$ | $C_{0.25}$ | $C_{0.5}$ | $C_{1.0}$ | $C_{2.0}$ | Total of $C_{0.125}$, $C_{0.5}$, $C_{1.0}$, and $C_{2.0}$ |
| Example 1 | 10.1 | 9.9 | 10.6 | 11.1 | 17.4 | 49.2 |
| Example 2 | 5.9 | 5.6 | 6.2 | 6.3 | 14.9 | 33.3 |
| Example 3 | 5.5 | 6.0 | 5.4 | 6.2 | 13.5 | 30.6 |
| Example 4 | 2.2 | 1.7 | 1.4 | 2.4 | 10.1 | 16.1 |
| Example 5 | 9.9 | 9.2 | 9.9 | 10.2 | 17.5 | 47.5 |
| Example 6 | 2.2 | 1.1 | 1.2 | 1.4 | 10.4 | 15.2 |
| Example 7 | 2.8 | 3.3 | 3.8 | 4.0 | 12.6 | 23.2 |
| Example 8 | 6.2 | 5.1 | 5.9 | 6.5 | 12.5 | 31.1 |
| Example 9 | 5.1 | 4.5 | 4.8 | 5.5 | 13.1 | 28.5 |
| Comparative Example 1 | 2.9 | 1.8 | 2.0 | 3.3 | 14.0 | 22.2 |
| Comparative Example 2 | 11.5 | 10.5 | 9.8 | 14.8 | 36.8 | 72.9 |
| Comparative Example 3 | 3.2 | 3.3 | 3.1 | 5.7 | 11.7 | 23.7 |
| Comparative Example 4 | 11.2 | 11.9 | 10.9 | 12.8 | 19.7 | 54.6 |

The results in Table 1 verify that the optical films in Examples have high anti-glare properties and high scratch resistance.

The optical film in Comparative Example 1 did not satisfy the scratch resistance due to its large Vmp. The optical film in Comparative Example 2 did not satisfy the jet-black appearance due to its small Vmp. The optical film in Comparative Example 3 did not satisfy the jet-black appearance due to its large Sal. The optical film in Comparative Example 4 did not satisfy the scratch resistance due to its small Sal.

REFERENCE SIGNS LIST

10: substrate
20: functional layer
21: anti-glare layer
22: anti-reflection layer
100: optical film
110: display element
120: image display panel

The invention claimed is:

1. An optical film having a surface with depressions and projections,
wherein the surface with depressions and projections is provided as a topmost surface of the optical film,
wherein the surface with depressions and projections has a peak material volume Vmp of 0.010 ml/m$^2$ or more and 0.050 ml/m$^2$ or less specified in ISO 25178-2:2012 and being calculated where an areal material ratio that separates a core portion and a reduced peak is 10%, and a minimum autocorrelation length Sal of 4.0 μm or more and 12.0 μm or less specified in ISO 25178-2:2012,
wherein the optical film comprises a functional layer on a substrate, the functional layer comprising an anti-glare layer, and a surface of the anti-glare layer is the surface with depressions and projections.

2. The optical film according to claim 1, wherein the surface with depressions and projections has a core void volume Vvc of 0.30 ml/m$^2$ or more and 1.00 ml/m$^2$ or less specified in ISO 25178-2:2012 and being calculated where an areal material ratio that separates a core portion and a reduced dale is 80%.

3. The optical film according to claim 1, wherein the surface with depressions and projections has a peak extreme height Sxp of 0.55 μm or more and 2.00 μm or less specified in ISO 25178-2:2012 and indicating a difference between a height at an areal material ratio of 2.5% and a height at an areal material ratio of 50%.

4. The optical film according to claim 1, wherein the surface with depressions and projections has an arithmetic mean height Sa of 0.20 μm or more and 1.00 μm or less specified in ISO 25178-2:2012.

5. The optical film according to claim 1, wherein the anti-glare layer contains a binder resin and particles.

6. The optical film according to claim 5, wherein the particles contain amorphous inorganic particles.

7. The optical film according to claim 6, wherein the particles further contain organic particles.

8. The optical film according to claim 5, wherein the binder resin contains a cured product of an ionizing radiation curable-resin composition.

9. The optical film according to claim 1, having a haze specified in JIS K7136: 2000 of 20% or more and 75% or less.

10. An image display panel comprising a display element and the optical film according to claim 1, wherein the optical film is disposed on the display element such that the surface with depressions and projections of the optical film faces the side opposite to the display element, and the optical film is disposed on the topmost surface.

11. An image display device comprising the image display panel according to claim 10.

12. An optical film having a surface with depressions and projections,
wherein the surface with depressions and projections is provided as a topmost surface of the optical film,
wherein the surface with depressions and projections has a peak material volume Vmp of 0.010 ml/m$^2$ or more and 0.050 ml/m$^2$ or less specified in ISO 25178-2:2012 and being calculated where an areal material ratio that separates a core portion and a reduced peak is 10%, and a minimum autocorrelation length Sal of 4.0 μm or more and 12.0 μm or less specified in ISO 25178-2: 2012,
wherein the optical film comprises a functional layer on a substrate, the functional layer comprising an anti-glare layer and an anti-reflection layer, and a surface of the anti-reflection layer is the surface with depressions and projections.

13. An image display panel comprising a display element and the optical film according to claim 12, wherein the optical film is disposed on the display element such that the surface with depressions and projections of the optical film faces a side opposite to the display element, and the optical film is disposed on a topmost surface.

14. An image display device comprising the image display panel according to claim 13.

15. An optical film having a surface with depressions and projections,
wherein the surface with depressions and projections is provided as a topmost surface of the optical film,
wherein the surface with depressions and projections has a peak material volume Vmp of 0.010 ml/m$^2$ or more and 0.050 ml/m$^2$ or less specified in ISO 25178-2:2012 and being calculated where an areal material ratio that separates a core portion and a reduced peak is 10%, and a minimum autocorrelation length Sal of 4.0 μm or more and 12.0 μm or less specified in ISO 25178-2: 2012,
wherein the optical film having a haze specified in JIS K7136: 2000 of 20% or more and 75% or less.

16. An image display panel comprising a display element and the optical film according to claim 15, wherein the optical film is disposed on the display element such that the surface with depressions and projections of the optical film faces a side opposite to the display element, and the optical film is disposed on a topmost surface.

17. An image display device comprising the image display panel according to claim 16.

18. The optical film according to claim 15, comprising a functional layer on a substrate, wherein a surface of the functional layer is the surface with depressions and projections.

19. The optical film according to claim 18, comprising an anti-glare layer as the functional layer, wherein a surface of the anti-glare layer is the surface with depressions and projections.

20. The optical film according to claim 18, comprising an anti-glare layer and an anti-reflection layer as the functional layer, wherein the surface of the anti-reflection layer is the surface with depressions and projections.

* * * * *